(12) United States Patent
Epshteyn

(10) Patent No.: US 7,757,800 B2
(45) Date of Patent: Jul. 20, 2010

(54) MONOCYLINDRICAL HYBRID POWERTRAIN AND METHOD OF OPERATION

(76) Inventor: Grigoriy Epshteyn, 804 Rossville Ave., Staten Island, NY (US) 10309

( * ) Notice: Subject to any disclaimer, the term of this patent is extended or adjusted under 35 U.S.C. 154(b) by 745 days.

(21) Appl. No.: 11/637,577

(22) Filed: Dec. 12, 2006

(65) Prior Publication Data

US 2008/0134675 A1   Jun. 12, 2008

(51) Int. Cl.
    *F16D 31/02* (2006.01)

(52) U.S. Cl. .......................... 180/165; 60/413; 60/489; 417/38; 417/364

(58) Field of Classification Search ............. 180/65.21, 180/165; 60/413; 91/504, 505; 417/53, 417/222.1, 269, 364; 123/56.3, 66, 68, 71 R
    See application file for complete search history.

(56) References Cited

U.S. PATENT DOCUMENTS

| | | | |
|---|---|---|---|
| 4,415,313 A * | 11/1983 | Bouthors et al. | 417/38 |
| 4,992,031 A * | 2/1991 | Sampo | 417/364 |
| 5,261,797 A | 11/1993 | Christenson | 417/380 |
| 5,556,262 A | 9/1996 | Achten et al. | 417/364 |
| 5,616,010 A | 4/1997 | Sawyer | 417/364 |
| 6,293,231 B1 | 9/2001 | Valentin | 123/46 R |
| 7,011,051 B2 * | 3/2006 | Epshteyn | 123/46 R |
| 7,047,867 B2 * | 5/2006 | Kalkstein et al. | 92/12.2 |
| 7,373,870 B2 * | 5/2008 | Epshteyn | 92/12.2 |
| 2006/0239839 A1 | 10/2006 | Epshteyn | |
| 2009/0126360 A1* | 5/2009 | Bordwell et al. | 60/413 |
| 2009/0188249 A1* | 7/2009 | Cannata | 60/413 |

OTHER PUBLICATIONS

U.S. Appl. No. 11/373, 793, filed Mar. 10, 2006 to the same inventor Epshteyn.

* cited by examiner

*Primary Examiner*—Lesley Morris
*Assistant Examiner*—Brodie Follman

(57) ABSTRACT

The monocylindrical hybrid powertrain is provided having a continuously variable volume hybrid engine, a pump, and a hydrostatic motor. A direct energy transmission, a variable displacement volume engine, a pump, and a hydrostatic motor and energy recuperation increases the specific power, decreases the weight, and installation space and enables the vehicle to achieve a fuel economy of 80 miles per gallon for the vehicle in city conditions.

15 Claims, 16 Drawing Sheets

3 — 3

US 7,757,800 B2

MONOCYLINDRICAL HYBRID POWERTRAIN AND METHOD OF OPERATION

CROSS-REFERENCE TO RELATED APPLICATIONS

Not Applicable

FEDERALLY SPONSORED RESEARCH

Not Applicable

SEQUENCE OF THE INVENTION

Not Applicable

BACKGROUND OF THE INVENTION

1. Field of Invention

This invention relates to the power association between hydrostatic and electric transmissions, specifically to a system comprising an internal combustion engine, a pump with a hydraulic motor and a combination of electrical power units, which are used for high efficiency automotive driving.

2. Background of the Invention

The hydrostatic transmission is used to drive wheels and working equipment of widely known machinery-construction, agricultural, and other heavy equipment.

Also, hybrid cars having an engine and electrical power unit combinations are widely known.

System engine-pumps are known to consist basically of familiar, expected and obvious structural configurations, notwithstanding the myriad of designs encompassed by the crowded prior art which have been developed for the fulfillment of countless objectives and requirements.

Some examples include, U.S. Pat. No. 5,261,797 to Christenson (1993), U.S. Pat. No. 5,556,262 to Achten et al. (1996), U.S. Pat. No. 5,616,010 to Sawyer (1997), U.S. Pat. No. 6,293,231 to Valentin (2001), and U.S. Pat. No. 7,011,051 to the same inventor Epshteyn (2006).

While these devices fulfill their respective, particular objectives and requirements, the aforementioned patents do not describe the monocylindrical hybrid powertrain and method of operation for providing compact design, increased efficiency and specific power while minimizing the fuel consumption.

The modem hydrostatic transmission has the following disadvantages:

(a) The pump and hydrostatic motor association requires hoses or pipes and does not provide compact and inexpensive solid mono-block design of the progressive hydrostatic transmission.

(b) The hybrid two-cycle engine, compressor, and pump synchronizing mechanism is complicated and expensive.

(c) The hybrid two-cycle engine, compressor, and pump system does not allow the stand-by electric energy accumulation by means of plug-in.

(d) The hybrid two-cycle engine, compressor and hydraulic pump system does not allow the engine capacity to decrease and simultaneously allow the vehicle to accelerate.

(e) The hybrid two-cycle engine, compressor, and hydraulic pump system does not allow the pneumohydraulic accumulator energy to be directly utilized for the engine piston return stroke.

3. Objects and Advantages

Therefore, it can be appreciated that there exists a continuing need for a new and improved monocylindrical hybrid powertrain providing joint operation of the progressive hydrostatic transmission and electric transmission having better specific data than known automotive engines and automatic transmissions. The present invention substantially fulfills these needs. The objectives and advantages of the present invention are:

(a) to provide compact, inexpensive, solid mono-block design of the hydrostatic transmission by means of having the valve plate fastened simultaneously to the engine cylinder and hydrostatic motor.

(b) to make the hybrid engine, compressor, and pump synchronizing mechanism simple and inexpensive by means of having the axial rods and compensating pistons used in the capacity of linear motor pushing to push the synchronizing mechanism against the swash plate.

(c) to provide electric stand-by energy accumulation and plug-in utilization by means of the hydrostatic motor and the electric motor association.

(d) to allow the engine capacity to decrease and, simultaneously, to allow the vehicle to accelerate by means of simultaneous stand-by electric and pneumohydraulic accumulator energy utilization.

(e) to provide the engine piston return stroke by means of the pneumohydraulic accumulator energy to actuate the stabilizer motor.

SUMMARY OF THE INVENTION

In accordance with the present invention, the monocylindrical hybrid powertrain comprises a two-cycle engine, a compressor, a pump with a rotor, a hydrostatic motor associated with an electric motor, a synchronizing mechanism with a pivotable swash plate, swash plate turn and shift mechanisms, a conic reducer, a swash plate turn hydraulic system, a swash plate shift hydraulic system, a hydraulic system, and a replenishing system.

The two-cycle engine is comprised of a cylinder with a cooling system, a piston with rings, a cylinder head with combustion chamber, a camshaft, an air injection valve, an exhaust valve, and an exhaust manifold. The engine piston is located between a compression chamber and a combustion chamber.

The compressor is comprised of a piston with rings, and the compression chamber is located within the engine cylinder between the engine and compressor pistons. The compressor piston is fastened to a hub. The compressor is comprised of intake and output valves located on the side surface of the engine cylinder. The output valve is coupled with the air injection valve of the engine by a receiver, which is comprised of a water jacket and is located on the side surface of the engine cylinder. The compressor intake valve is connected with the first lobe by means of a rod and pivotably mounted rocker. The compressor output valve is connected with the second lobe and both lobes are fastened to the pump's rotor.

The pump housing is the engine cylinder and is joined to a valve plate. A pump's rotor is comprised of stabilizer motor pistons and a plunger fastened to the engine piston. The plunger, rotor, compressor piston and hub are located coaxially. The rotor is coupled with the engine cylinder by a beating with a disc spring. The first valve plate is comprised of pump inlet and outlet slots, which are associated with the pump chamber canal which comprises a stabilizer motor's inlet and outlet slots. The opposite valve plate is fastened to the spin-valve and associated with the spin-valve disc by the circular slot, two autonomous slots, a bearing and a spring. The spin-valve axis, rotor axis and replenishing system pump shaft axis are located on one center line. Within the valve plate, mounted a bearings and an intermediate shaft connect the rotor, spin-valve, and replenishing pump shaft.

The synchronizing mechanism comprises two axial rods, compensating pistons and a lever. Axial rods are coupled with compensating pistons inside of the rotor, coupled with the swash plate by shoes outside of the rotor and located diametrically opposite within rotor. The compensating pistons have a smaller diameter than the diameters of the axial rods and the formed differential pistons within pump chamber. The compensating piston ends are located within said rotor autonomous chambers and fluidly connected with an axial canal located diametrically opposite to the pump chamber canal and both canals associated with the valve plate inlet and outlet slots of said pump.

The first axial rod is pivotably and directly coupled to the lever and connected to the pump plunger by the assembled crossbar. The lever is pivotably coupled with the rotor by sliders and an axle, and is pivotably coupled with a crossbar by said sliders. The second axial rod is coupled directly to the sliding holder, which is pivotably coupled with compressor piston's hub inside of the rotor.

The conic reducer's first gearwheel is fastened to the rotor and the second gearwheel mounted on one shaft with a first sprocket wheel and are associated by means of a chain with a second sprocket wheel fastened to said engine camshaft, which, on the opposite side of the engine, comprises a pulley associated with an accessory unit by means of a belt. The second conic gearwheel having a shaft with bearings, a first sprocket wheel, and a housing forming a modular assembly is fastened to the engine cylinder. The accessory regular units (not illustrated)—a cooling system pump, an electric system generator, and a steering pump are associated with the belt.

The swash plate is associated with the pump's valve plate by a swash plate turn mechanism and swash plate shift mechanism.

The swash plate turn mechanism is comprised of a servo cylinder with piston. The swash plate pin is pivotably coupled with servo cylinder piston by a rod. The servo cylinder is fastened to the valve plate.

The swash plate shift mechanism is comprised of a servo cylinder with piston and a lever. The swash plate is pivotably coupled with a servo cylinder piston by a lever and a hinge pin. The servo cylinder is fastened to the valve plate and the lever is pivotably coupled with the bracket fastened to the valve plate.

The swash plate turn hydraulic system is comprised of a hydraulic distributor with solenoids. First and second lines of the distributor are connected with the servo cylinder, while a third line is coupled with the pneumohydraulic accumulator, and a fourth line of the distributor is coupled with the tank.

The swash plate shift hydraulic system is comprised of a hydraulic distributor with solenoids. First and second lines of the distributor are connected with the servo cylinder, a third line is coupled with the pneumohydraulic accumulator, and a fourth line of the distributor is coupled with the tank.

The hydrostatic motor associated with at least one electric motor and the hydrostatic motor shaft. The electric motor's shaft is located on one axis and is coupled with one gear respectively by first and second clutches.

The hydraulic system of the hybrid is comprised of first and second hydraulic distributors with solenoids. The four way first hydraulic distributor has a first line connected in parallel to a pump outlet and the hydrostatic motor inlet by a check valve, a second line coupled with the pump inlet, a third line coupled in parallel with the replenishing pump outlet, and a stabilizer motor outlet and fourth line coupled with the pneumohydraulic accumulator.

The three-way second hydraulic distributor has a first line connected to the stabilizer motor inlet, a second line coupled with the spin-valve circular slot, and third line connected to the pneumohydraulic accumulator.

The first spin-valve autonomous slot is coupled with the pneumohydraulic accumulator and second autonomous slot is coupled with the replenishing pump outlet.

The replenishing system comprises the replenishing pump connected in parallel to an accumulator and a relief valve.

There has thus been outlined, rather broadly, some features of the invention so that the detailed description that follows may be better appreciated. There are, of course, additional features of the invention that will be described hereinafter which will form the subject matter of the claims appended hereto.

In this respect, before explaining at least one embodiment of the invention in detail, it is to be understood that the invention is not limited in its application to the details of construction and to the arrangements of the components set forth in the following description illustrated in the drawings. The invention is capable of other embodiments and capable of being practiced and carried out in various ways. Also, it is to be understood that the Patent phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hybrid, which has all the advantages of the prior art systems having an engine, a pump and a hydrostatic motor and none of the disadvantages.

It is another object of the present invention to provide a new and improved hybrid, which may be easy and efficiently manufactured and marketed at a low price.

It is an object of the present invention to provide decreases in weight and installation space of the hydrostatic transmission.

It is a further object of the present invention is to provide a smaller operational cost of the hybrid.

An even further object of the present invention is to provide regular accessory systems for the engine and hydrostatic transmission, which will reduce the price.

Lastly, it is an object of the present invention to provide a new and improved hybrid for increasing the efficiency and specific power, while minimizing the installation space and fuel consumption necessary in particular for an automobile.

In accordance with the present invention, the monocylindrical hybrid powertrain further comprises a two-cycle engine, a compressor, a pump with a rotor, a hydrostatic motor associated with an electric motor, a synchronizing mechanism with a pivotable swash plate, a swash plate turn and shift mechanisms, a conic reducer, a swash plate turn hydraulic system, a swash plate shift hydraulic system, a hydraulic system and a replenishing system.

The two-cycle engine is comprised of a cylinder with a cooling system, a piston with rings, a cylinder head with a combustion chamber, a camshaft, an air injection valve, an exhaust valve and an exhaust manifold. The engine piston is located between the compression chamber and the combustion chamber.

The compressor is comprised of a piston with rings and the compression chamber is located within the engine cylinder between the engine and compressor pistons. The compressor piston is fastened to a hub. The compressor is comprised of intake and output valves, which are located on the side surface of the engine cylinder. The output valve is coupled with the air injection valve of the engine by a receiver, which is comprised of a water jacket and is located on the side surface of the engine cylinder. The compressor intake valve is connected with the first lobe by means of a rod and pivotably mounted rocker. The compressor output valve is connected with the second lobe and both lobes are fastened to the pump's rotor.

The pump housing is the engine cylinder and is joined to a valve plate. The pump's rotor is comprised of stabilizer motor pistons and a plunger fastened to the engine piston. The plunger, rotor, compression piston, and hub are located coaxially. The rotor is coupled with the engine cylinder by a bearing with a disc spring. The first valve plate is comprised of pump inlet and outlet slots, which are associated with the pump chamber canal and comprise a stabilizer motor's inlet and outlet slots. The opposite valve plate is fastened to the spin-valve and is associated with the spin-valve disc by the circular slot, two autonomous slots, a bearing and a spring. The spin-valve axis, the rotor axis, and a charging system pump shaft axis are located on one center line. Within the valve plate, there are mounted bearings and an intermediate shaft connecting the rotor, the spin valve, and a replenishing pump shaft.

The synchronizing mechanism comprises two axial rods, compensating pistons, and a lever. Axial rods are coupled with compensating pistons inside of the rotor, which is coupled with the swash plate by shoes outside of the rotor and is located diametrically opposite within rotor. The compensating pistons have a smaller diameter than the diameter of the axial rods and formed differential pistons within a pump chamber. The compensating piston ends are located within said rotor autonomous chambers and are fluidly connected with an axial canal located diametrically opposite to the pump chamber canal. Both canals are associated with a valve plate inlet and outlet slots of said pump.

The first axial rod is pivotably and directly coupled to the lever and connected to the pump plunger by the assembled crossbar. The lever is pivotably coupled with the rotor by sliders and an axle, and is pivotably coupled with a crossbar by sliders. The second axial rod is coupled directly to the sliding holder which is pivotably coupled with compressor piston's hub inside of the rotor.

The conic reducer's first gearwheel is fastened to the rotor and the second gearwheel is mounted on one shaft with a first sprocket wheel which is associated by means of a chain with a second sprocket wheel which is fastened to said engine camshaft, which, on the opposite side of the engine, comprises a pulley associated with an accessory unit by means of the belt. The second conic gearwheel comprises a shaft with bearings, a first sprocket wheel, and a housing formed modular assembly fastened to the engine cylinder. The accessory regular units (not illustrated)—a cooling system a pump, an electric system generator, and a steering pump are associated with the belt.

The swash plate is associated with the pump's valve plate by swash plate turn mechanism and swash plate shift mechanism.

The swash plate turn mechanism is comprised of a servo cylinder with a piston. The swash plate pin is pivotably coupled with a servo cylinder piston by a rod. The servo cylinder is fastened to the valve plate.

The swash plate shift mechanism is comprised of a servo cylinder with a piston and a lever. The swash plate is pivotably coupled with a servo cylinder piston by a lever and a hinge pin. The servo cylinder is fastened to the valve plate and the lever is pivotably coupled with the bracket fastened to the valve plate.

The swash plate turn hydraulic system is comprised of a hydraulic distributor with solenoids. First and second lines of the distributor are connected with the servo cylinder, a third line is coupled with the pneumohydraulic accumulator, and a fourth line of the distributor is coupled with the tank.

The swash plate shift hydraulic system is comprised of a hydraulic distributor with solenoids. First and second lines of the distributor are connected with the servo cylinder, a third line is coupled with the pneumohydraulic accumulator, and a fourth line of the distributor is coupled with the tank.

The hydrostatic motor is associated with at least one electric motor and the hydrostatic motor shaft. The electric motor's shaft is located on one axis and is coupled with one gear respectively by first and second clutches.

The hydraulic system of the hybrid is comprised of first and second hydraulic distributors with solenoids. The four way first hydraulic distributor has a first line connected in parallel to a pump outlet and the hydrostatic motor inlet by check valve. A second line is coupled with the pump inlet, a third line coupled in parallel with the replenishing pump outlet and a stabilizer motor outlet, and a fourth line is coupled with the pneumohydraulic accumulator.

The three way second hydraulic distributor has a first line connected to the stabilizer motor inlet, a second line coupled with the spin-valve circular slot, and a third line connected to the pneumohydraulic accumulator.

The first spin valve autonomous slot is coupled with the pneumohydraulic accumulator and the second autonomous slot is coupled with the replenishing pump outlet.

The replenishing system comprises a replenishing pump connected in parallel to an accumulator and a relief valve.

DRAWINGS

Figures

FIGS. 18C and 186D show a fluid flow diagram of the engine idling respectively during the engine piston downwards and upwards movement in accordance with the present invention;

The same reference numerals refer to the same parts through the various figures.

Figure 18:
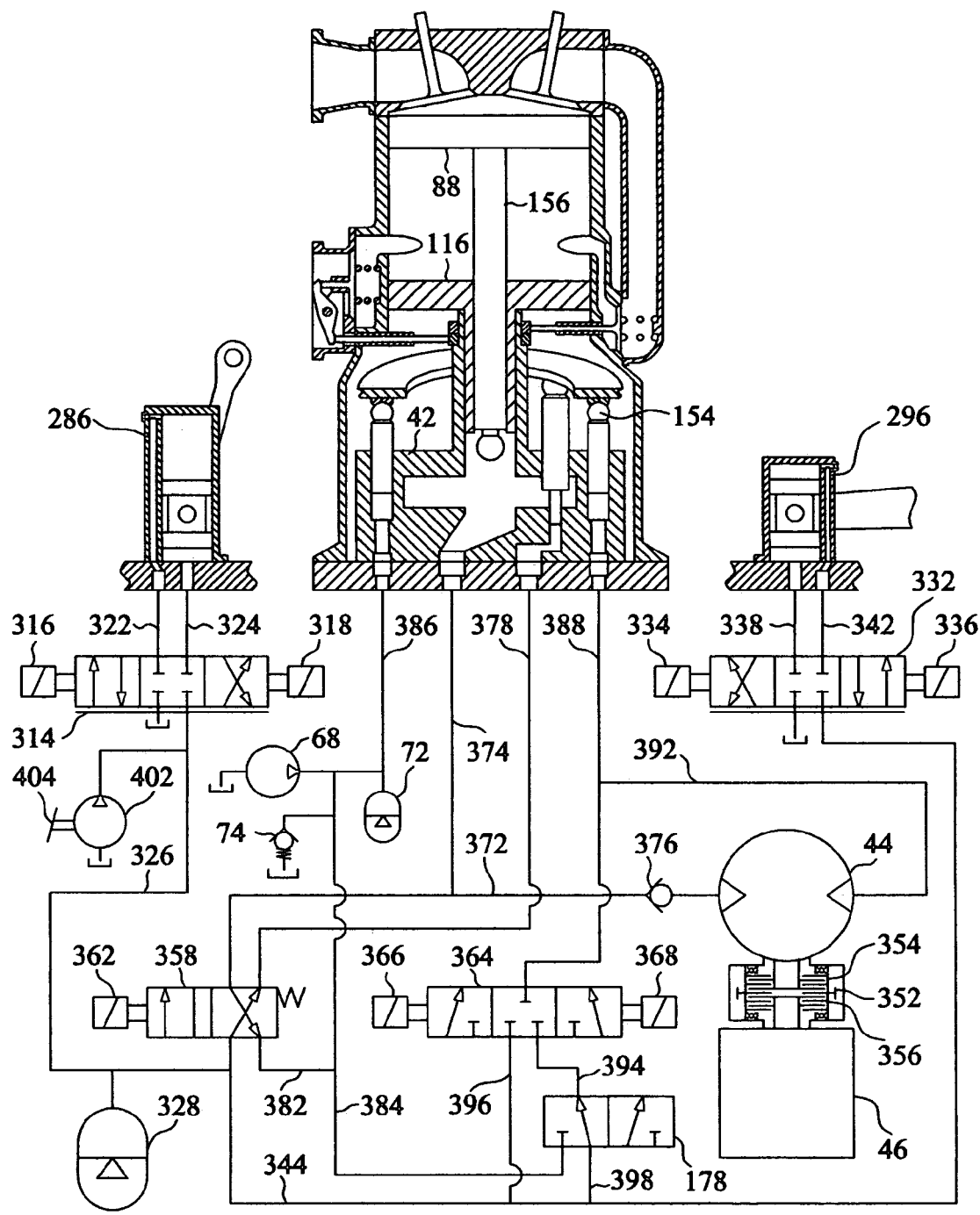
FIG. 18 shows a hydraulic diagram of the present invention.

Arrows located on hydraulic lines (FIG. 18A-FIG. 18H) show the fluid flow direction in accordance with the hydraulic diagram on FIG. 18.

Figure 7:
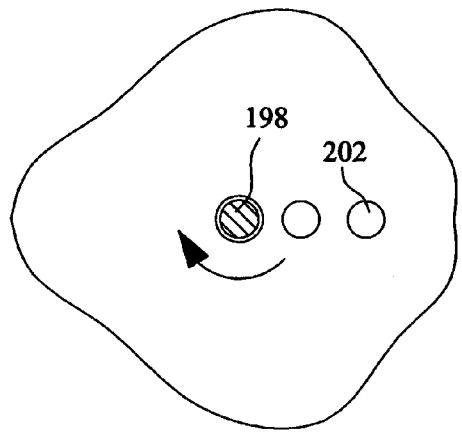
FIG. 7 shows a section along the valve plate and spin valve disc position in relation to the time of engine piston power stroke of the present invention.
Figure 8:
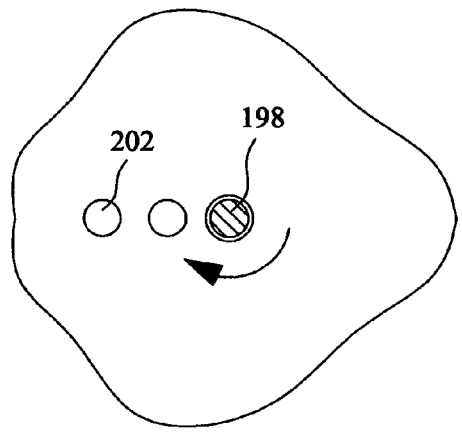
FIG. 8 shows a section along the valve plate and spin valve disc position in relation to the time of engine piston return stroke of the present invention.
Figure 9:
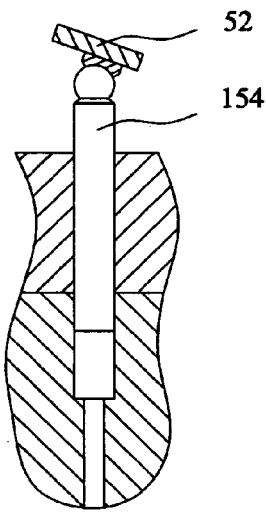
FIG. 9 shows a section along the axis of the stabilizer hydraulic motor piston of the present invention.
Figure 10:
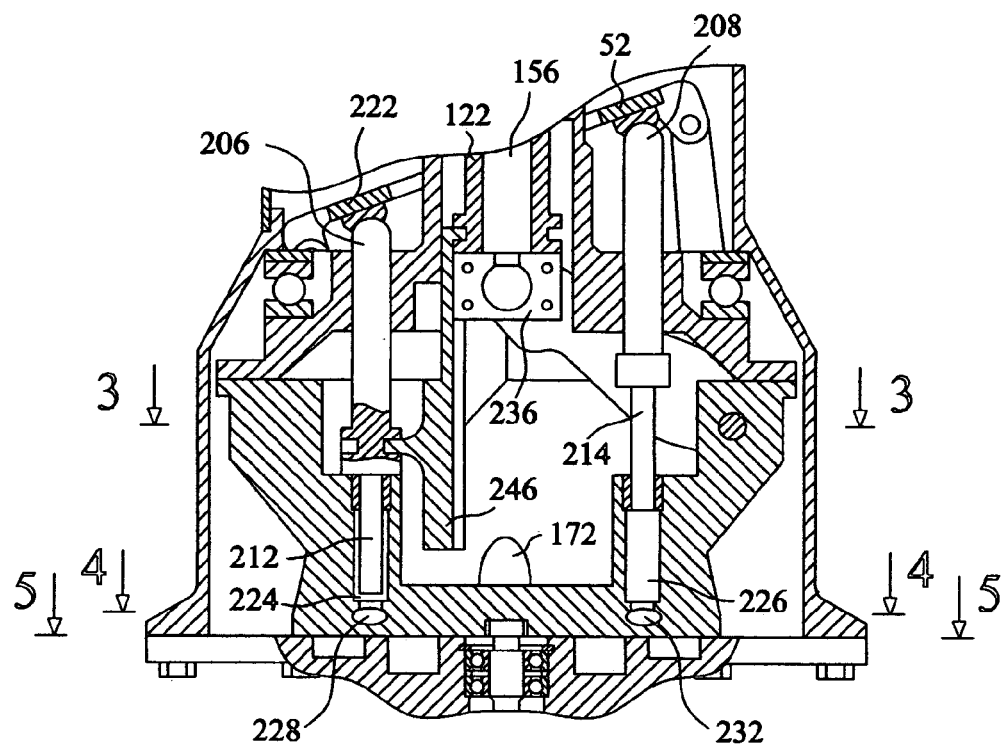
FIG. 10 shows a detailed section along the axial rods axis of the present invention.
Figure 11:
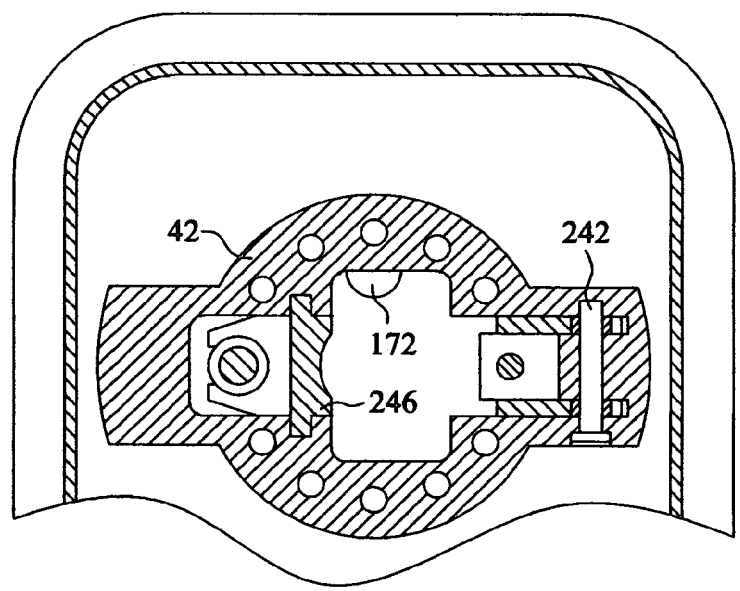
FIG. 11 is a detailed view of the portion indicated by the section lines 3-3 in FIG. 10.
Figure 12:
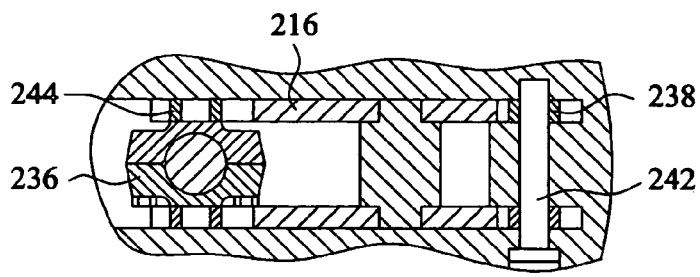
FIG. 12 shows a section along the lever of the synchronizing mechanism of the present invention.
Figures 13, 14:
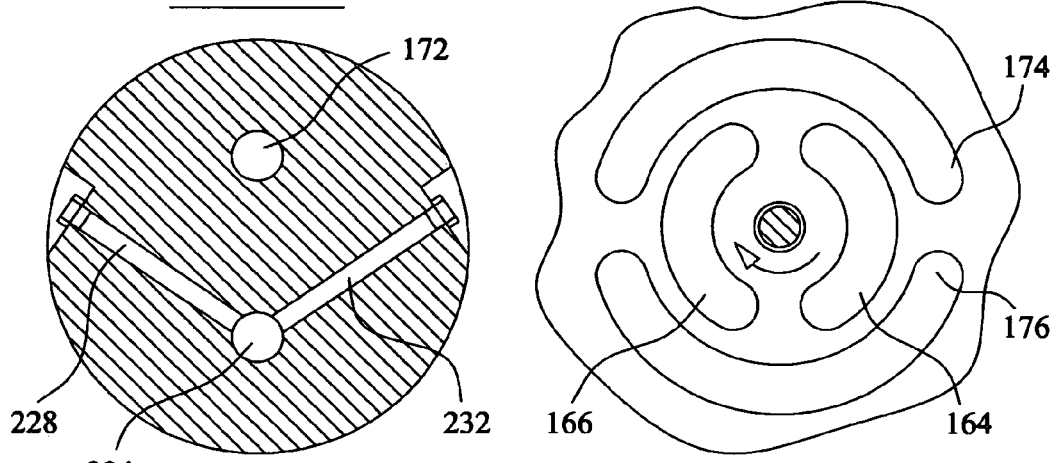
FIG. 13 is a detailed view of the portion indicated by the section lines 4-4 in FIG. 10.
FIG. 14 is a detailed view of the portion indicated by the section lines 5-5 in FIG. 10.
Figure 15:
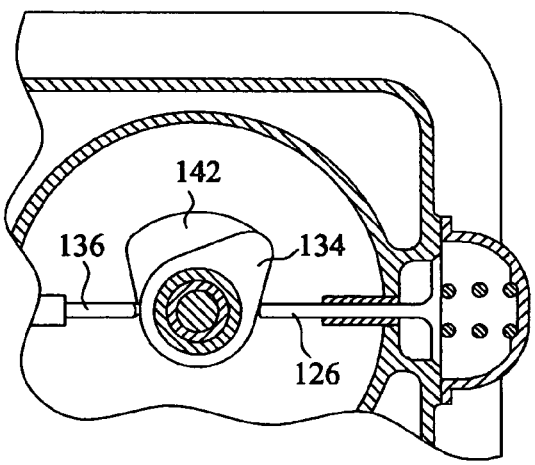
FIG. 15 shows a cross section of the cylinder along the compressor output valve of the present invention.
Figure 16:
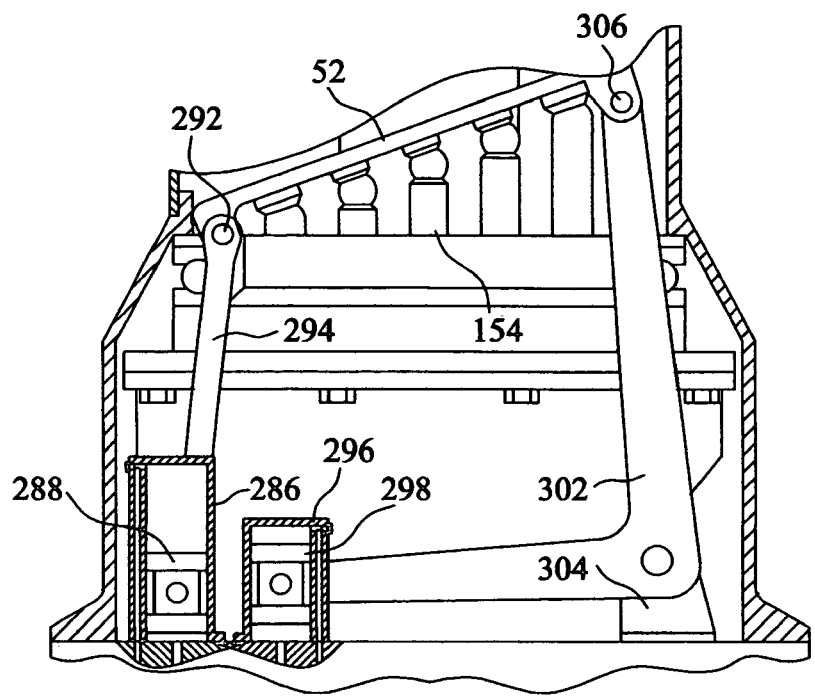
FIG. 16 is a front view of the swash plate turn and swash plate shift mechanisms of the present invention.
Figure 17:
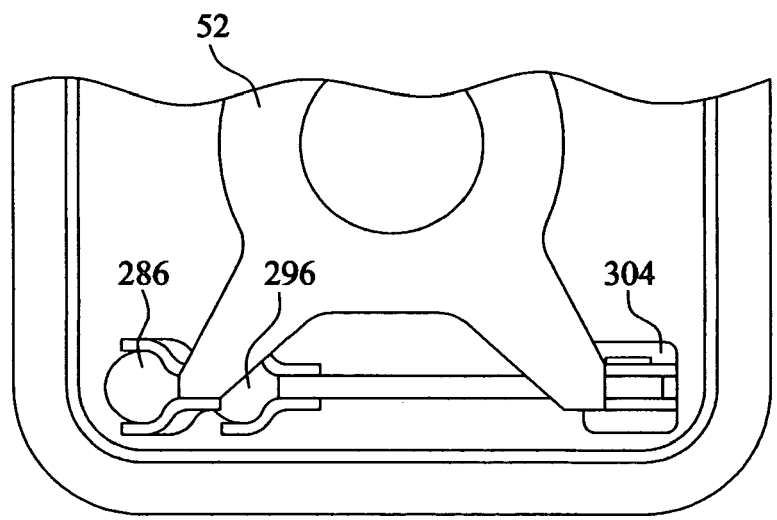
FIG. 17 is a plan of the swash plate turn and swash plate shift mechanisms of the present invention.

Arrows located on FIG. 7, FIG. 8, FIG. 14 show the direction of rotor rotation.

| DRAWINGS - Reference Numerals | | | |
|---|---|---|---|
| 32 | hybrid | 34 | engine |
| 36 | compressor | 38 | pump |
| 42 | rotor | 44 | hydrostatic motor |
| 46 | electric motor | 48 | synchronize mechanism |
| 52 | swash plate | 54 | swash plate turn mechanism |
| 56 | swash plate shift mechanism | 58 | conic reducer |
| 62 | swash plate turn hydraulic system | 64 | swash plate shift hydraulic system |
| 66 | hydraulic system | 68 | replenishing pump |
| 72 | accumulator | 74 | relieve valve |
| 84 | engine cylinder | 86 | engine cooling system |
| 88 | engine piston | 92 | engine piston rings |
| 94 | engine cylinder head | 96 | combustion chamber |
| 98 | engine camshaft | 102 | air injection valve |
| 104 | exhaust valve | 106 | exhaust manifold |
| 108 | compressor chamber | 116 | compressor piston |
| 118 | compressor piston rings | 122 | hub |
| 124 | compressor intake valve | 126 | compressor output valve |
| 128 | receiver | 132 | water jacket of receiver |
| 134 | lobe of compressor intake valve | 136 | rod |
| 138 | rocker | 142 | lobe of compressor output valve |
| 152 | valve plate | 154 | stabilizer motor piston |
| 156 | plunger of pump | 158 | bearing of rotor |
| 162 | disc spring | 164, 166 | slots of pump |
| 168 | pump chamber | 172 | pump chamber canal |
| 174, 176 | slots of stabilizer motor | 178 | spin valve |
| 182 | spin valve disc | 184 | circular slot |
| 186, 188 | autonomous slots | 192 | bearing |
| 194 | spring | 196 | bearing |
| 198 | intermediate shaft | 202 | canal of spin valve |
| 206, 208 | axial rods | 212, 214 | compensate pistons |
| 216 | lever | 222 | shoes |
| 224, 226 | autonomous chambers | 228, 232 | canals |
| 234 | axial canal | 236 | crossbar |
| 238 | sliders | 242 | axle |
| 244 | sliders | 246 | sliding holder |
| 256, 258 | conic gearwheels | 262 | shaft |

-continued

DRAWINGS - Reference Numerals

| 264 | sprocket wheel | 266 | chain |
|---|---|---|---|
| 268 | second sprocket wheel | 272 | pulley |
| 274 | belt | 276 | bearing |
| 278 | housing | 286 | servo cylinder |
| 288 | piston | 292 | pin of swash plate |
| 294 | rod | 296 | servo cylinder |
| 298 | piston | 302 | lever |
| 304 | bracket | 306 | hinge pin of swash plate |
| 314 | hydraulic distributor | 316, 318 | solenoids |
| 322, 324, 326 | hydraulic lines | 328 | pneumohydraulic accumulator |
| 332 | hydraulic distributor | 334, 336 | solenoids |
| 338, 342, 344 | hydraulic lines | 352 | gear |
| 354, 356 | clutches | 358 | hydraulic distributor |
| 362 | solenoid | 364 | hydraulic distributor |
| 366, 368 | solenoids | 372, 374 | hydraulic lines |
| 376 | check valve | 378, 382 | hydraulic lines |
| 384, 386 | hydraulic lines | 388, 392, 394 | hydraulic lines |
| 396, 398 | hydraulic lines | 402 | starter pump |
| 404 | pedal | | |

DETAILED DESCRIPTION

With reference now to the drawings, and in particular, to FIGS. 1 through 22 thereof, the preferred embodiment of the new and improved hybrid embodying the principles and concepts of the present invention will be described.

Specifically, it will be noted in the various Figures that the device relates to a hybrid for providing increased efficiency and specific power while minimizing the weight, and fuel consumption, necessary in particular for an automobile hydrostatic transmission.

In accordance with the present invention, the monocylindrical hybrid powertrain further comprises a two-cycle engine, a compressor, a pump with a rotor, a hydrostatic motor associated with an electric motor, a synchronizing mechanism with a pivotable swash plate, swash plate turn and shift mechanisms, a conic reducer, a swash plate turn hydraulic system, a swash plate shift hydraulic system, a hydraulic system, and a replenishing system.

The hybrid 32 (FIG. 1) is comprised of a two cycle engine 34, a compressor 36, a pump 38 with a rotor 42, a hydrostatic motor 44, an electric motor 46 (FIG. 18) a synchronizing mechanism 48 (FIG. 1) with a pivotable swash plate 52, a swash plate turn mechanism 54, a swash plate shift mechanism 56, a conic reducer 58, a swash plate turn hydraulic system 62, a swash plate shift hydraulic system 64 (FIG. 4), a hydraulic system 66 (FIG. 1), a replenishing system pump 68 (FIG. 18), an accumulator 72, and a relief valve 74. The conventional accessory units are not illustrated.

The two-cycle engine is comprised of a cylinder 84 (FIG. 2) with a cooling system 86, a piston 88 with rings 92, a cylinder head 94 with a combustion chamber 96, a camshaft 98, an air injection valve 102, an exhaust valve 104, and an exhaust manifold 106. The engine piston is located between the compression chamber 108 and the combustion chamber 96.

The compressor is comprised of a piston 116 (FIG. 2) with rings 118 and the compression chamber is located within the engine cylinder between the engine and compressor pistons. The compressor piston is fastened to a hub 122. The compressor is comprised of intake 124 and output 126 (FIG. 2, FIG. 15) valves, which are located on the side surface of the engine cylinder. The output valve is coupled with the air injection valve of the engine by a receiver 128, which is comprised of a water jacket 132 and is located on the side surface of engine cylinder. The compressor intake valve is connected with the first lobe 134 (FIG. 2, FIG. 15) by means of a rod 136 and pivotably mounted rocker 138. The compressor output valve is connected with the second lobe 142 and both lobes are fastened to the pump's rotor.

Figure 1:
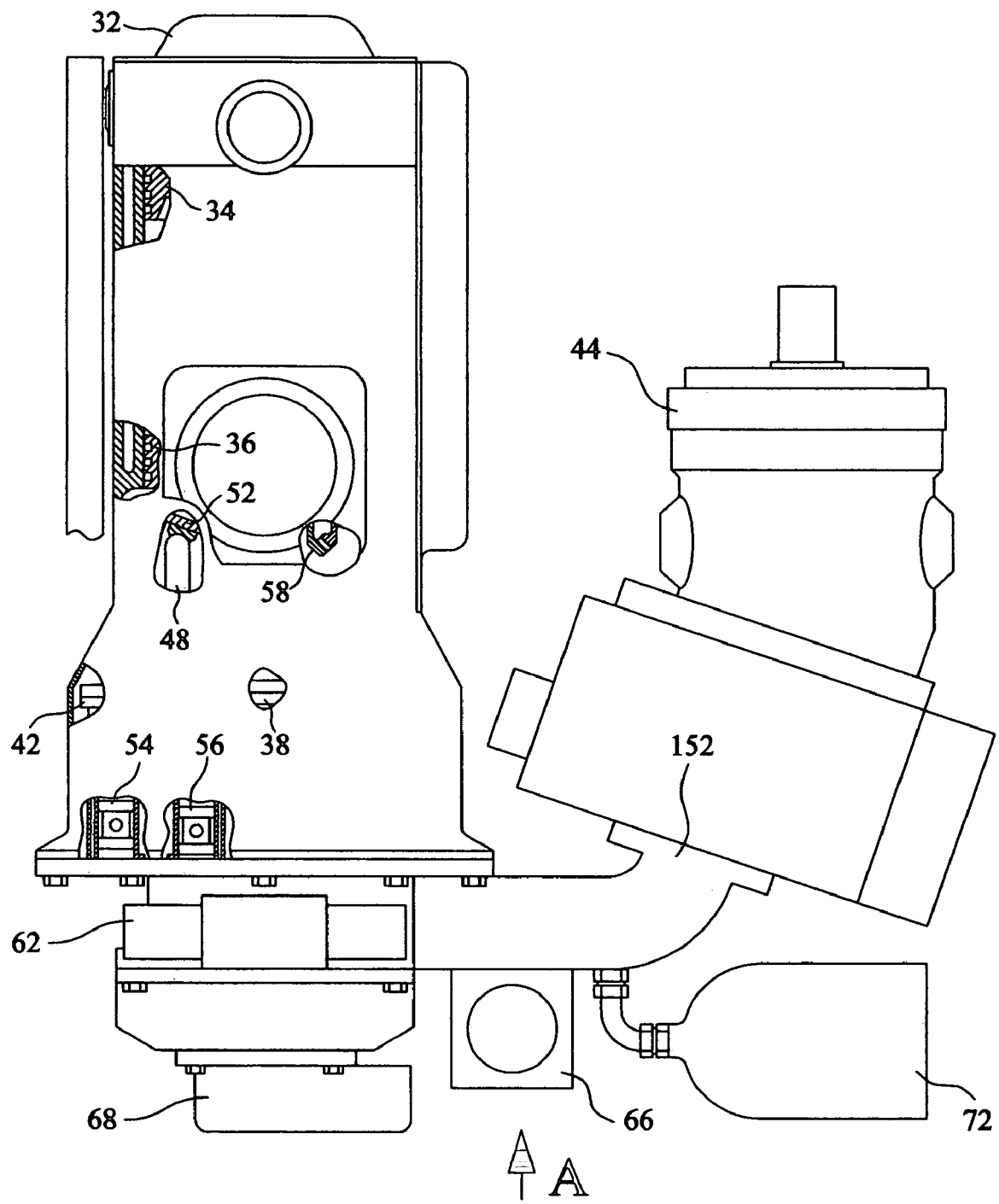
FIG. 1 shows a preferred embodiment of the monocylindrical hybrid powertrain in accordance with the principles of the present invention.
Figure 2:
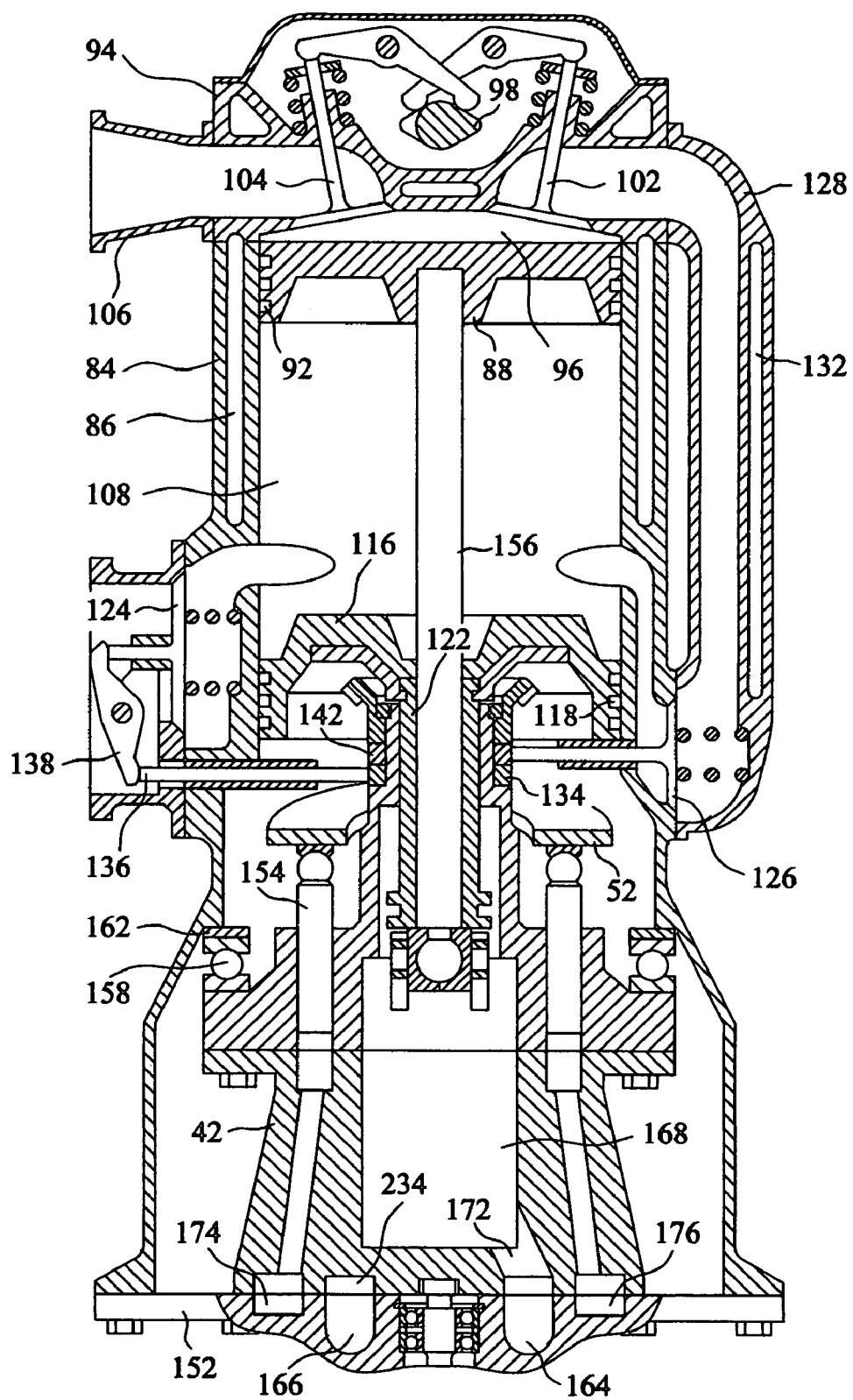
FIG. 2 shows a section in detail along of engine and compressor valves of the present invention.
Figure 3:
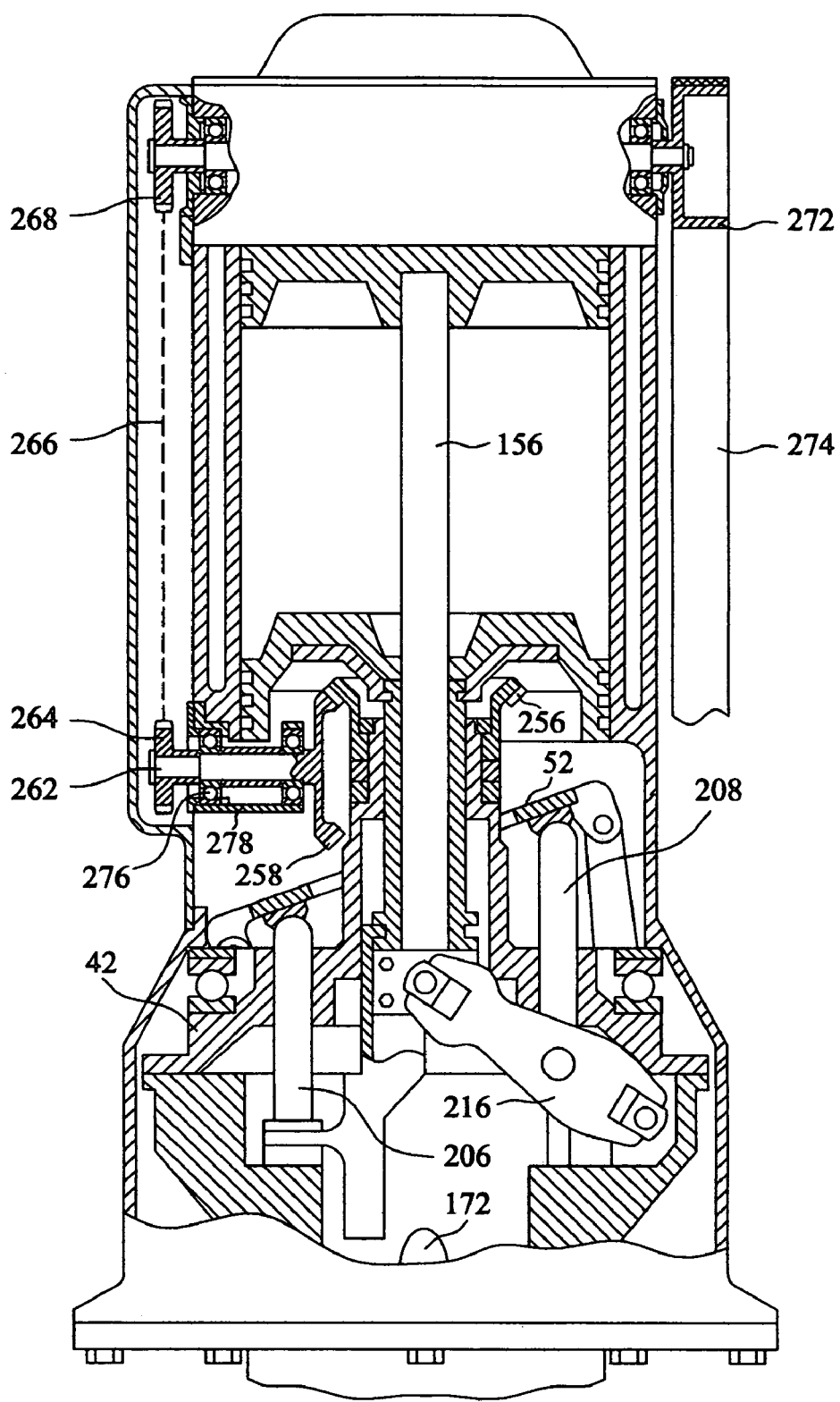
FIG. 3 shows a section in detail along of axial rods axis of the present invention.
Figure 4:
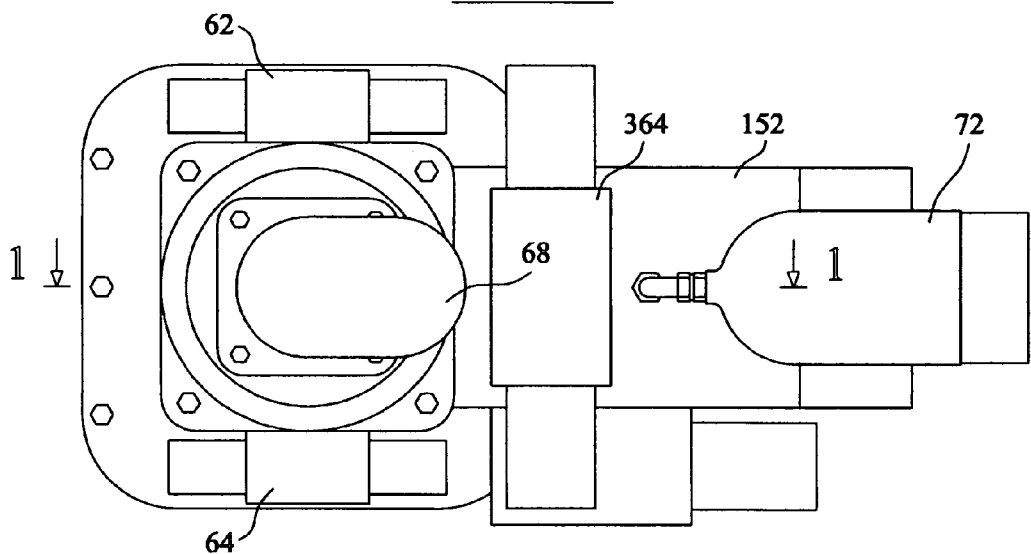
FIG. 4 shows a view A of FIG. 1 of the present invention.

The pump housing is the engine cylinder and is joined to a valve plate 152 (FIG. 2). A pump's rotor is comprised of stabilizer motor pistons 154 (FIG. 2, FIG. 9) and a plunger 156 fastened to the engine piston. The plunger, rotor, compressor piston, and hub are located coaxially. The rotor is coupled with the engine cylinder by a bearing 158 with a disc spring 162. The first valve plate is comprised of pump inlet and outlet slots 164, 166 (FIG. 2, FIG. 14), associated with the pump chamber 168 and canal 172, and comprise a stabilizer motor's inlet and outlet slots 174, 176 (FIG. 2, FIG. 14). The opposite valve plate is fastened to the spin valve 178 (FIG. 5) and associated with the spin valve disc 182 by the circular slot 184 (FIG. 5, FIG. 6), two autonomous slots 186, 188 (FIG. 5, FIG. 6), a bearing 192, and a spring 194. The spin-valve axis, rotor axis, and replenishing pump shaft axis are located on one center line. Mounted within the valve plate are bearings 196 and an intermediate shaft 198 connected the rotor, spin valve, and replenishing pump shaft. The spin valve disc 182 comprises canal 202.

The synchronizing mechanism comprises two axial rods 206, 208 (FIG. 3, FIG. 10) compensating pistons 212,214, and a lever 216. Axial rods are coupled with compensating pistons inside of the rotor, are coupled with the swash plate 52 by shoes 222 outside of the rotor, and are located diametrically opposite within rotor. The compensating pistons have a smaller diameter than the diameter of the axial rods and formed differential pistons within pump chamber. Compensating piston ends are located within said rotor autonomous chambers 224, 226 (FIG. 10), are fluidly connected by canals 228, 232 with an axial canal 234 (FIG. 13), are located diametrically opposite to the pump chamber canal 172, and both canals are associated with valve plate inlet and outlet slots of said pump.

The first axial rod is pivotably and directly coupled to the lever 216 and connected to the pump plunger by the assembled crossbar 236. The lever is pivotably coupled with the rotor by sliders 238 (FIG. 12) and an axle 242 (FIG. 11, FIG. 12), and is pivotably coupled with a crossbar by sliders 244. The second axial rod is coupled directly to the sliding holder 246 (FIG. 10, FIG. 11) which is pivotably coupled with the compressor piston's hub inside of the rotor.

The conic reducer's first gearwheel 256 (FIG. 3) is fastened to the rotor and the second gearwheel 258 is mounted on one shaft 262 with a first sprocket wheel 264 associated by means of chain 266 with a second sprocket wheel 268 fastened to said engine camshaft, which, on the opposite side of the engine, comprises a pulley 272 associated with an accessory unit by means of the belt 274. The second conic gearwheel 258, the shaft 262 with bearings 276, the first sprocket wheel and housing 278 formed modular assembly are fastened to the engine cylinder. The regular accessory units (not illustrated)—a cooling system pump, an electric system generator, and a steering pump are associated with the belt.

The swash plate is associated with the pump's valve plate by a swash plate turn mechanism and a swash plate shift mechanism.

The swash plate 52 (FIG. 1) turn mechanism 54 is comprised of a servo cylinder 286 (FIG. 16, FIG. 17) with a piston 288. The swash plate pin 292 is pivotably coupled with a servo cylinder piston by a rod 294. The servo cylinder is fastened to the valve plate.

The swash plate 52 (FIG. 1) shift mechanism 56 is comprised of a servo cylinder 296 (FIG. 16, FIG. 17) with a piston 298 and a lever 302. The swash plate is pivotably coupled with a servo cylinder piston by a lever 302, a bracket 304 and a hinge pin 306. The servo cylinder and bracket are fastened to the valve plate and the lever pivotably coupled with the bracket.

The swash plate turn hydraulic system 62 (FIG. 1) is comprised of a hydraulic distributor 314 (FIG. 18) with solenoids 316, 318. First and second lines 322, 324 of the distributor are connected with the servo cylinder 286, a third line 326 is coupled with the pneumohydraulic accumulator 328, and a fourth line of the distributor is coupled with a tank.

The swash plate shift hydraulic system 64 (FIG. 4) is comprised of a hydraulic distributor 332 (FIG. 18) with solenoids 334, 336. First and second lines 338, 342 of the distributor are connected with the servo cylinder 296, a third line 344 is coupled with the pneumohydraulic accumulator, and a fourth line of the distributor is coupled with the tank.

The hydrostatic motor 44 (FIG. 18) is associated with at least one electric motor 46 and the hydrostatic motor shaft, and the electric motor's shaft is located on one axis and is coupled with one gear 352 respectively by first and second clutches 354, 356.

The hydraulic system of the hybrid is comprised of a first hydraulic distributor 358 (FIG. 18) with a solenoid 362 and a second hydraulic distributor 364 with solenoids 366, 368. The four way first hydraulic distributor has a first line 372 connected in parallel to a pump outlet and the hydrostatic motor inlet by line 374 and check valve 376, a second line 378 is coupled with the pump inlet, a third line 382 is coupled in parallel with the replenishing pump 68 outlet and a stabilizer motor outlet by lines 384, 386, and a fourth line is coupled with the pneumohydraulic accumulator.

The three way second hydraulic distributor has a first line 388 (FIG. 18) connected to the stabilizer motor inlet and by line 392 to the hydrostatic motor 44 outlet, a second line 394 is coupled with the spin valve 178 circular slot 184 (FIG. 5, FIG. 6), and a third line 396 (FIG. 18) is connected to the pneumohydraulic accumulator.

The first spin valve 178 autonomous slot 186 (FIG. 5, FIG. 6) is coupled with the pneumohydraulic accumulator by line 398 (FIG. 18) and the second autonomous slot 188 (FIG. 5, FIG. 6) is coupled with the replenishing pump outlet by line 384 (FIG. 18).

The starter pump 402, by means of the pedal 404, provides an opportunity to increase the pneumohydraulic accumulator fluid pressure with manual power in an emergency.

With respect to the above description then, it is to be realized that the optimum dimensional relationships for the parts of the invention, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modifications and equivalents may be resorted to, falling within the scope of the invention.

Description of Operation

The hybrid has starting, restarting, idling, work mode of operation, and pneumohydraulic accumulator (PFIA) charging by means of engine power operation and by muscle efforts. Also, the hybrid provides power by means of the stand-by energy, the hydrostatic motor, electric motor automotive start acceleration, automotive regenerative breaking, and automotive emergency forward and reverse movement.

The operator initiates the start. Switching from start to idle mode is automatic. The work mode is initiated automatically after the accelerator pedal (not illustrated) is depressed. The PHA charging by means of an engine can to occur during the automotive parking automatically. Also, the hybrid can provide PHA charging during the automotive deceleration through regenerative breaking.

Engine Start.

Figure 18A:
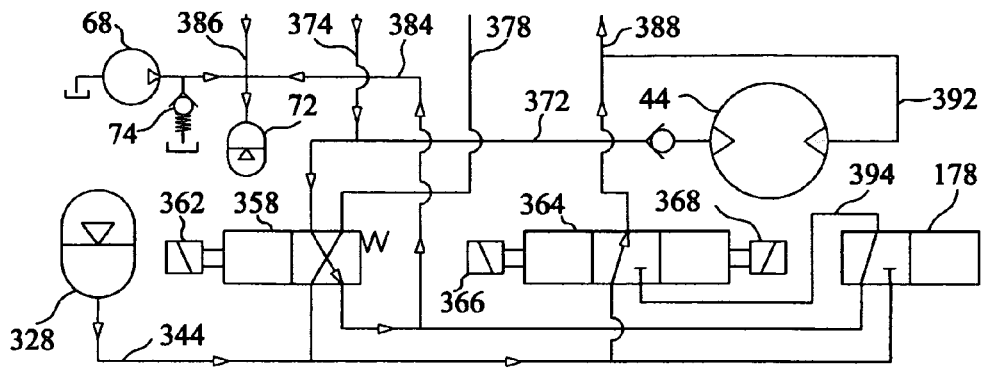
FIGS. 18A and 18B show a fluid flow diagram of the engine start respectively during the engine piston downwards and upwards movement in accordance with the present invention.
Figure 18B:
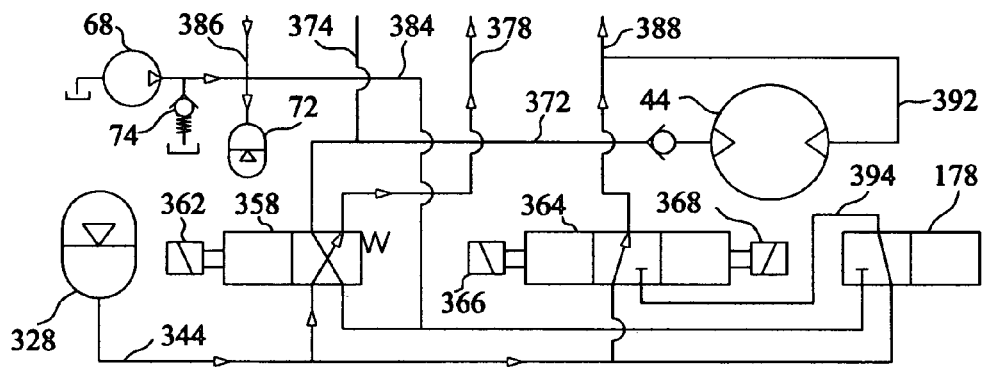

The operator switches to start by key ignition (not illustrated) and the solenoid 366 switches distributor 364 to start the engine (FIG. 18, FIG. 18A, FIG. 18B). During the starting process, pressurized fluid goes from the PHA 328 via the distributor 358 and lines 344, 378 to the pump inlet, and via distributor 364 and lines 344, 388 to the stabilizer motor inlet. The pressurized fluid activates the stabilizer motor and goes to the replenishing system accumulator 72 along line 386 from the stabilizer motor outlet which is independent of the engine piston direction movement. Simultaneously, pressurized fluid in the pump inlet actuates engine piston return stroke.

Thus, PHA fluid supply actuates the stabilizer motor motion during the engine piston's downward stroke, and during the engine piston's return stroke, the PHA fluid supply actuates, simultaneously, the stabilizer motor motion and the pump plunger motion occurs in the capacity of the linear hydraulic motor.

Because compensating piston ends are fluidly connected with an axial canal located diametrically opposite to said pump chamber, high pressure canal fluid from PHA actuates, in turn, axial rods and compensating piston ends. So during the engine start, there is permanent pushing of an axial rod against the swash plate.

The stabilizer motor is run by pistons 154 (FIG. 9) interacting with the swash plate 52 by rotating the rotor and actuating the plunger with the engine piston to top end position. The engine piston compresses the air in the combustion chamber, and conventional fuel injection (not illustrated) initiates the power stroke of the engine.

The rotor by the conic reducer, the sprocket wheels, and chain activate the engine camshaft, which by means of the pulley with the belt actuate conventional accessory units: a cooling system pump, an electric system generator, and a steering pump (not illustrated).

During one half revolution, while the pump chamber canal connects with the pump inlet slot, the outlet slot is closed. During the second half revolution, while the rotor canal connects with the pump outlet slot, the inlet slot is closed. Such sequences occur in the all the operating modes.

So operates a high-power hydraulic starter. The starter is able to quickly start and restart the single cylinder engine.

The high pressurized fluid enables a quiet starting process to occur, and also enables an engine to shut down at every red traffic light with decreased fuel consumption. This is very valuable in particular for an automobile's hydrostatic transmission.

If the fluid pressure in the PHA is not sufficient, the pump 402 (FIG. 18) with the pedal 404 provides an opportunity to increase fluid pressure by human power. Thus, the hydraulic system enables one to start and restart engine independent of any external energy sources such as an electric battery, for example, thus providing the autonomous work of a hybrid and engine start, irrespective of parking time.

Idling Mode.

The rotor angular velocity increases after the start up. A speed sensor (not illustrated) switches the solenoid 362 (FIG. 18, FIG. 18C, FIG. 18D) and the distributor 358 connects PHA in parallel to the pump outlet and hydrostatic motor 44 inlet by lines 344, 374, 372 and check valve 376. The distributor 364 keeps the engine in start position. The engine automatically switches from starting mode to the idling mode. The hydrostatic motor shaft is braked during the idling, which occurs by minimum engine volume displacement and pump.

During the engine piston's downward motion (FIG. 18C), the fluid goes from the pump outlet via the line 374 and the pump inlet line 378, is closed. During the engine piston's upward motion (FIG. 18D), the fluid goes to the pump inlet and the pump outlet is closed.

Figure 18C:
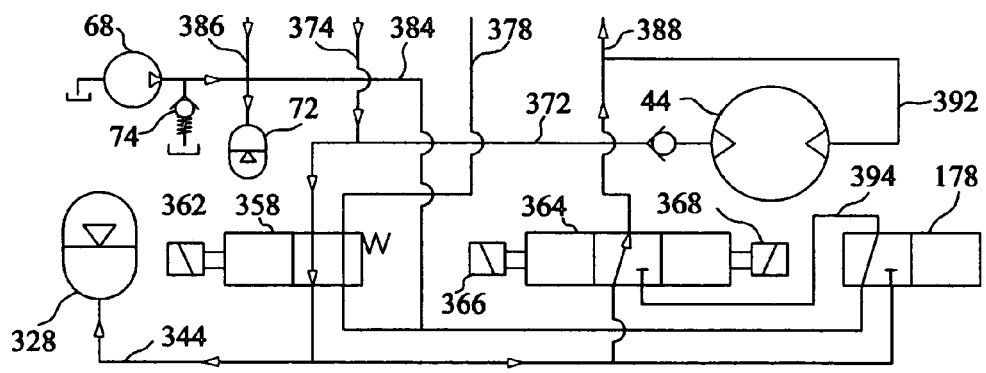
Figure 18D:
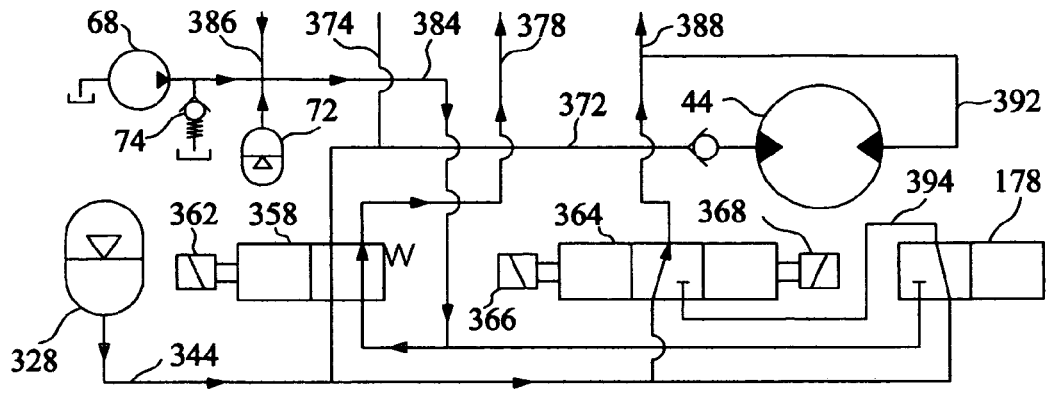

The pump displacement volume is approximately equal to the stabilizer motor displacement volume. During the half rotor revolution (the engine piston's downward motion), the pump supply is the entire pump displacement volume, but the stabilizer motor intake is only half of the pump volume. Because the pump is coupled in parallel with PHA and with the stabilizer motor by lines 374, 372,344, 388, the pump's fluid volume surplus enters the PHA (FIG. 18C). During the next half rotor revolution (the engine piston's upward motion), this fluid volume surplus goes from the PHA to the stabilizer motor inlet via lines 344 and 388 (FIG. 18D).

So occurs the engine piston return stroke by means of the stabilizer motor using the PHA energy and actuating the hybrid motion. The stabilizer motor actuates the hybrid motion independent of the engine piston direction movement.

Figure 20A:
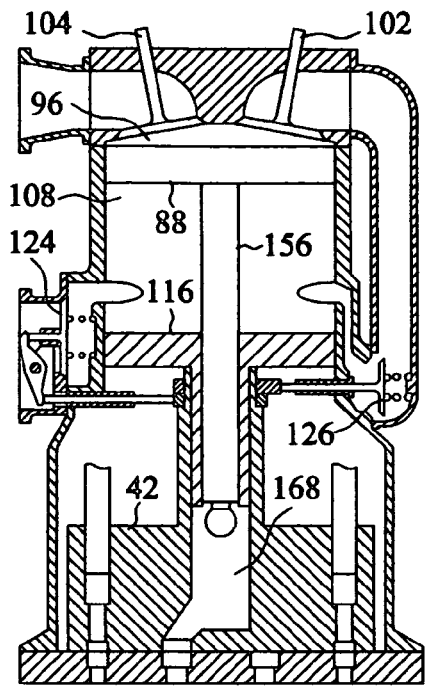
FIGS. 20A to 20D show an operating sequence of hybrid in accordance with the present invention.
Figure 20B:
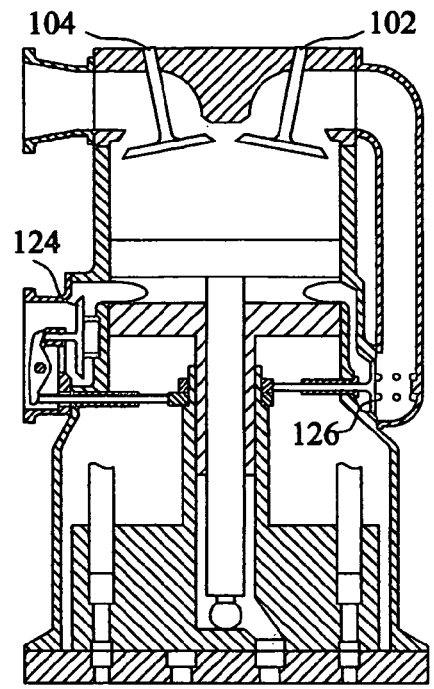

The energy of combustion pressure is transmitted to the piston-plunger during its movement from the top end position (TEP) to the bottom end position (BEP). This process is illustrated in FIG. 20A. The engine valves 104, 102 are closed. The compressor intake valve 124 is closed and the output valve 126 is open.

The sliding holder 246 and hub 122 (FIG. 10) are actually a bearing because the compressor piston is not rotating. The crossbar 236 and plunger 156 (FIG. 10) is actually a bearing because the pump plunger is not rotating.

Because compensating piston ends are fluidly connected with an axial canal located diametrically opposite to said pump chamber canal, high pressure fluid from the pneumohydraulic accumulator actuates, in turn, axial rods and compensating piston ends. So during the idling, permanent pushing of said axial rods against said swash plate occurs.

Thus, the synchronizing mechanism provides the opposite movement of thr engine and compressor pistons. The rotor drives the engine camshaft by the conic reducer gearwheels 256, 258 (FIG. 3) sprocket wheels 264, 268 and chain 266 and, simultaneously, the rotor rotates the lobes 134, 142 (FIG. 2, FIG. 15) activating the compressor intake valve 124 and output valve 126.

So the synchronizing mechanism provides the engine and compressor valves with motion, with consequential performance in compliance with a two-stroke working cycle; and each engine piston stroke from TEP to BEP is a power stroke.

The movement of all components of the synchronizing mechanism is submerged in oil within the pump chamber to provide high quality lubrication and to increase the efficiency.

The compressor piston and axial rod have equal strokes. The lever gives the piston plunger an increased stroke, in accordance with the lever ratio.

Thus, the opposing movement of the compressor and the engine pistons allows the space under the engine piston to function as a chamber of the compressor. This ensures that the noise is decreased, because static energy is used, (that is, air pressure, instead of air high speed), i.e. kinetic energy as in a conventional blower. Because the pistons are moving in opposing directions, the engine piston becomes, in essence, a compressor piston. This results in direct energy transmission for air compression and provides increased efficiency.

The opposing movement provides simple and high-quality balancing of the system because the compressor piston compensates for the inertial forces influencing the piston and plunger. This considerably decreases the vibration and determines the stationary connection of the engine cylinder and hydrostatic motor by valve plate. This forms the hydrostatic transmission solid monoblock.

The pistons' opposing movement provides a compressor displacement volume greater than the volume of the engine, because it is formed by the superposition of the motions of the engine and compressor pistons. This increases air mass intake and specific power of the engine. The idling mode continues as long as the accelerator pedal is not depressed.

Work Mode.

Figure 18E:
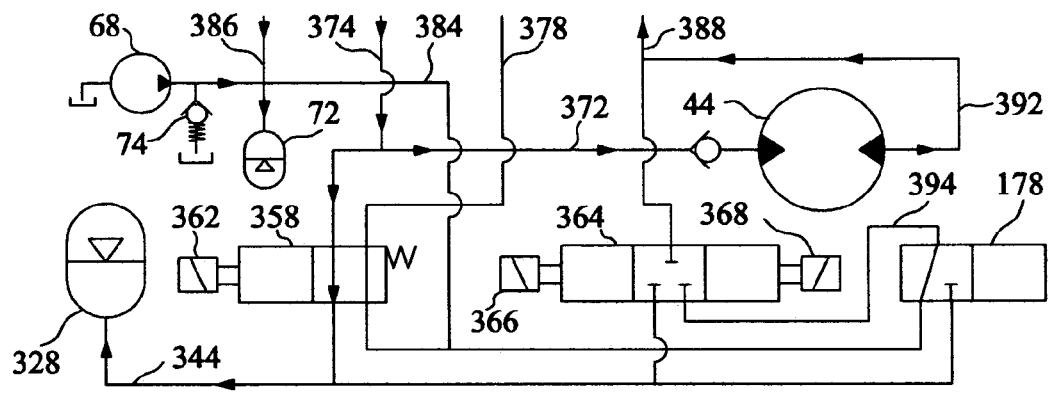
FIGS. 18E and 18F show a fluid flow diagram of the engine work operation respectively during the engine piston downwards and upwards movement in accordance with the present invention.
Figure 18F:
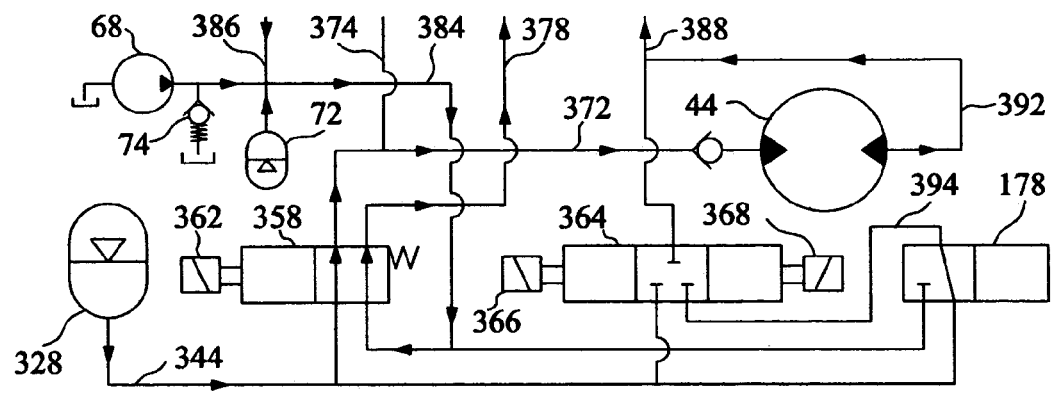
Figure 18G:
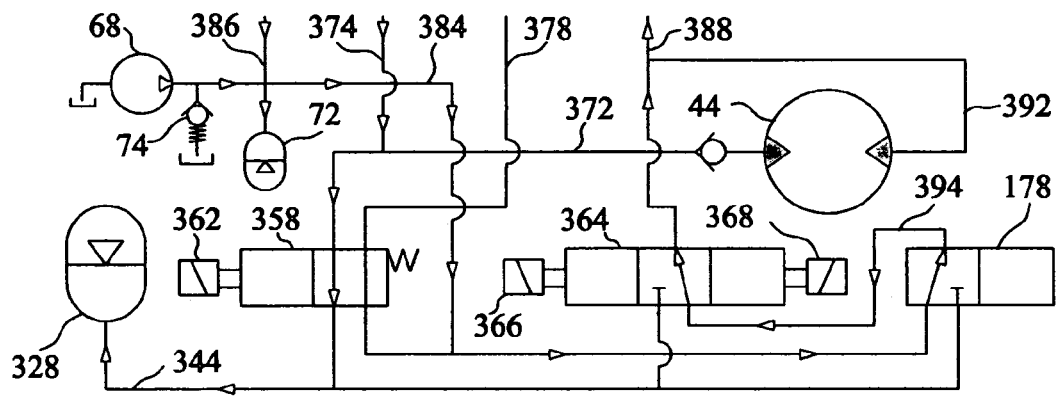
FIGS. 18G and 18H show a fluid flow diagram of the pneumohydraulic accumulator charge by means of the engine power operation respectively during the engine piston downwards and upwards movement in accordance with the present invention.
Figure 18H:
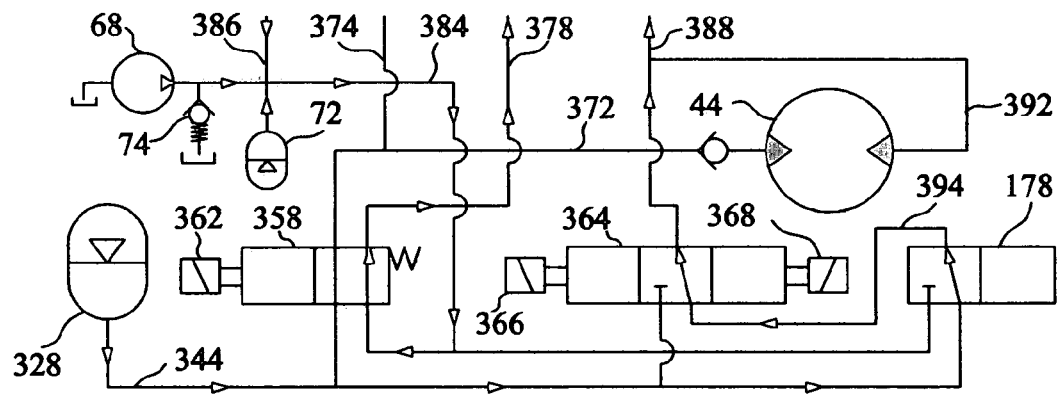

The accelerator pedal (not illustrated) depression increases the rotor angular velocity and a speed sensor (not illustrated) switches off the solenoid 366 (FIG. 18, FIG. 18E, FIG. 18F). The distributor 364 switches to the neutral position and closes the lines 388, 394, 396. The distributor 358 keeps the engine in idling position. Thus, the hydraulic system automatically switches from idling to work mode if the accelerator pedal is depressed.

The FIGS. 20A, 20B, 20C, 20D illustrates the hybrid operating sequence during a single revolution of the rotor (two cycles of the engine).

Figure 19A:
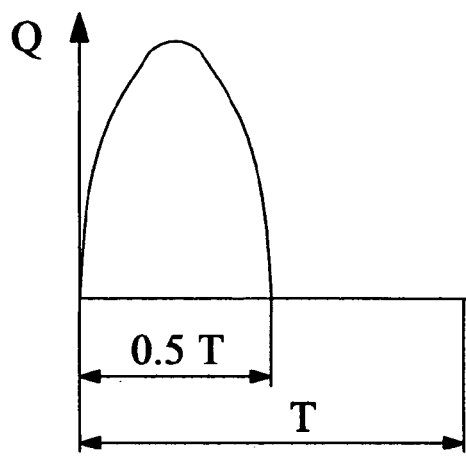
FIG. 19A is a diagram illustrating the pump supply during the one cycle of the engine operation in accordance with the present invention.
Figure 19B:
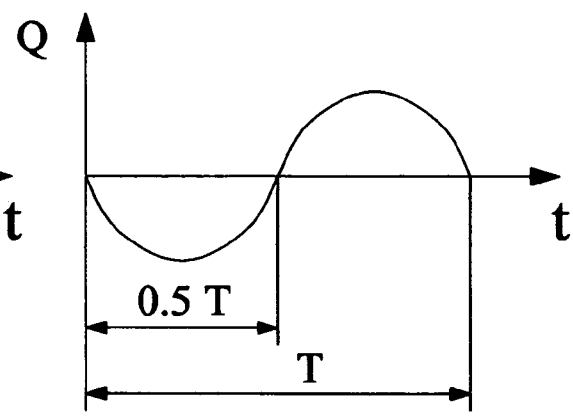
FIG. 19B is a diagram illustrating the pneumohydraulic accumulator fluid flow during the one cycle of the engine operation in accordance with the present invention.
Figure 19C:
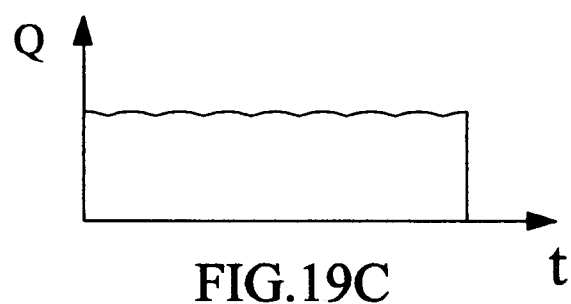
FIG. 19C is a diagram illustrating the fluid flow via hydrostatic motor in accordance with the present invention.

The FIG. 20A shows the piston-plunger power stroke from TEP to BEP and, simultaneously, the compressor piston power stroke with motion in opposite directions. The engine valves 104, 102 are closed, the compressor output valve 126 is open and the intake valve 124 is closed. The pressurized fluid flow goes from the pump outlet via lines 374, 372 (FIG. 18, FIG. 18E) and check valve 376 to the hydrostatic motor 44 inlet and, via lines 392, 388, to the stabilizer motor inlet. The pump and the stabilizer motor displacement volume are approximately equal. During the half cycle, the pump supply is equal to the pump displacement volume, but the stabilizer motor intake is only half of the pump volume because the pump and stabilizer motor are coupled in series. The fluid volume surplus is transmitted via distributor 358 and line 344 enters the PHA 328. During the next half cycle (FIG. 18F the engine piston's upward motion), this fluid volume surplus enters the motor 44 inlet from the PHA via lines 344, 372, check valve 376, and distributor 358. Diagrams in figures FIG. 19A, FIG. 19B, FIG. 19C show this process. The T is one cycle time. The Q (FIG. 19A) is the supply of the pump continues to half cycle time, the PHA (FIG. 19B) half cycle time receives fluid from the pump and the next half cycle time delivers fluid to the hydrostatic motor. The hydrostatic motor receives a uniform fluid supply (FIG. 19C) during the whole cycle.

Simultaneously, the fluid goes from a hydraulic replenishing system via lines 384, 378 and a distributor 358 to the pump inlet, providing necessary suction fluid pressure and providing return stroke of the engine piston. Thus, transforming the single pump plunger supply pulsation into a uniform fluid flow feeding said hydrostatic motor during said engine power operation occurs. The uniform fluid flow via hydrostatic motor determines the stabilizer motor and hydrostatic motor connection in series.

The hydrostatic motor's smooth operation occurs independent of the pump supply pulsation because the pump supply charges PHA and simultaneously actuates the connecting in series of the hydrostatic motor and the stabilizer motor during engine power stroke and during engine piston return stroke PHA fluid supply actuates the hybrid motion. This provides permanent pushing of the axial rods against the swash plate and allows use of one simple single cylinder hybrid instead of an expensive, complicated, and heavy multi-cylinder engine, compressor, and a pump. Because of direct energy transmission, the engine piston return stroke occurs with minimum energy losses and minimum specific fuel consumption. Also, this decreases weight, cost, and installation space of the hybrid.

The energy of combustion pressure is transmitted to the piston-plunger during its movement from the TEP to the BEP during a half revolution of the rotor.

The greatest part of the power flow is the pump supply directly from the pump outlet to the motor.

The pump plunger fixed to the engine piston provides direct energy transmission. This allows use of one simple unit hybrid instead of two complicated and heavy regular units (an engine and a pump). Also, the hybrid solves the problem of using a reciprocating engine and a compressor without a crankshaft or connecting rods. This increases efficiency and decreases fuel consumption.

The pump plunger disposition on the rotor's centerline allows a considerable increase in rotor speed rotation and transmission power in comparison with a conventional pump.

All of these factors enable us to increase the pump power to equal the maximum engine power.

The second, and much smaller, part of the power flow uses the interaction of the underside of the engine piston with the compressor piston to compress air. The compressor piston motion is provided by fluid pressure on the hub 122 in the pump chamber simultaneously with the pump power stroke without cross forces. The air compression with direct energy transmission by means of the fluid pressure increases efficiency and decreases fuel consumption. The additional air cooling by the receiver water jacket 132 (FIG. 2) increases the engine thermal efficiency and decreases fuel consumption.

The third and smallest part of the power flow is transmitted to an engine and compressor valves and accessory units.

The location of the piston-plunger (inside the cylinder and simultaneously inside the hub 122) and the minimum magnitude of cross forces as it moves, allow the engine piston length to be minimized. The location of the compressor piston and the hub (simultaneously within the cylinder and the rotor) allows the compressor piston length to be minimized. This provides a compact design, minimizes piston mass, and forces of inertia.

In work mode, the synchronizing mechanism provides movement of the compressor piston and the rotation of the rotor, in synchronization with the piston-plunger movement, irrespective of the engine load or rate of acceleration.

Thus, the power strokes of the engine, pump, and compressor are taking place simultaneously, with direct energy transfer, without any intermediate mechanisms, and without a cross force influence from the pistons or the plunger. This minimizes and simplifies the design, and increases the longevity and the efficiency of the hybrid.

In the hybrid, the weight and installation space are smaller than in the conventional system engine-pump thanks to the direct energy transmission.

The synchronizing mechanism provides a two stroke working cycle; and each engine piston stroke from TEP to BEP is a power stroke. The piston-plunger in BEP and the compressor piston in TEP simultaneously complete their power stroke. The air is compressed in the receiver to maximum pressure.

The piston-plunger movement from BEP to TEP (FIG. 20B, FIG. 20C, FIG. 20D) occurs simultaneously with the compressor piston movement from TEP to BEP, during a half revolution of the rotor. The compressor intake valve 124 is open, the output valve 126 is closed and the air is sucked into the compressor chamber. Simultaneously, the fluid goes to pump inlet from the hydraulic replenishing system.

Because of its location on the side surface of the cylinder, the compressor intake valve diameter can be made much larger than the intake valve of a regular engine, with equal displacement volume. The intake air is cooler because it does not pass through the combustion chamber as with a conventional engine. This increases volumetric efficiency and air mass in the compressor chamber. Such joint factors improve the engine operation in all conditions and particular at low atmospheric pressure, for example, high above sea level.

The engine piston movement from BEP to TEP is comprised of three successive processes: combined clearing, joint compression, and finish compression (of the air in the case of diesel or of the mixture in the case of a gasoline engine) by the engine piston. The combined clearing process is shown in the FIG. 20B. There are three factors in the combined clearing process.

The valves 102, 104 are open. The piston-plunger moves from BEP to TEP and displaces the burned gases (the first factor). Simultaneously, high pressurized air, injected from the receiver through the open valve 102 also displaces the burned gases (the second factor). The clearing process provides the high-pressurized air, which was compressed in the previous stroke while the engine piston is moved downward.

This combined action intensifies the exhaust process and increases the volumetric efficiency. The additional cooling (intercooling) of air by the water jacket of the receiver is the third factor. Thus, the three joint factors improve the filling process (of the air in case of diesel, or of the mixture in case of gasoline engine) and increase the specific power of the engine. The combined clearing process ends when the exhaust valve is closed.

Figure 20C:
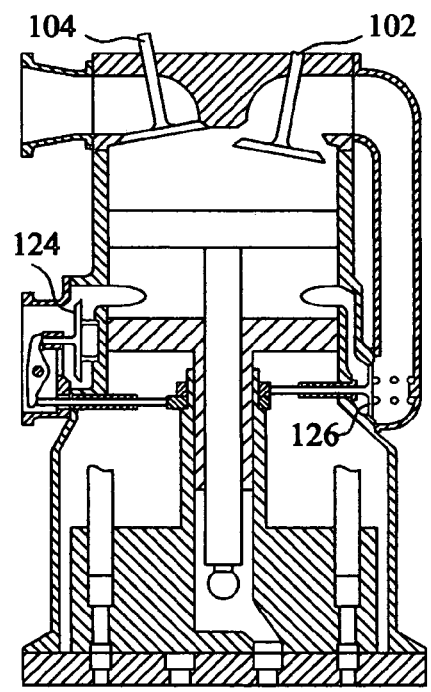

The joint compression process is shown in the FIG. 20C.

The exhaust valve 104 is closed and the air injection valve 102 is open. The engine piston continues movement, and, jointly with the air injection, increases air pressure in the cylinder because the air pressure within the receiver is greater than that within the combustion chamber. The joint compression process ends when the injection valve is closed.

Figure 20D:
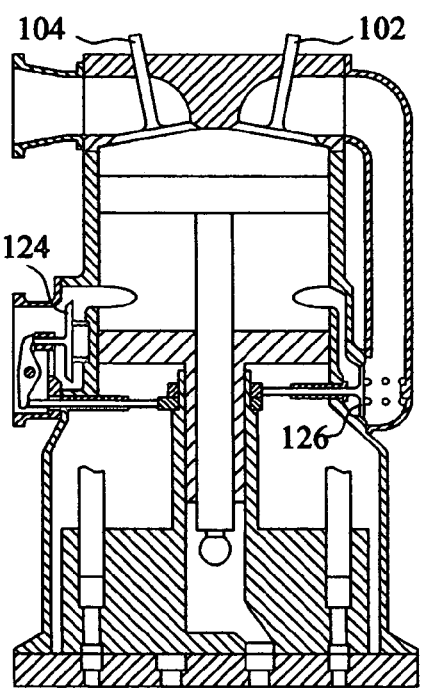

The finish compression process is shown in the FIG. 20D. The valves 102, 104 are closed. The engine piston continues compression. Before TEP, the pressure in the cylinder becomes the maximum. A conventional fuel injection system (not illustrated) provides the start of the engine power stroke. The working cycle ends after one rotor revolution.

Thus, the two-cycle engine of the hybrid uses inexpensive four cycle engine cylinder head, with the intake valve functioning as an air injection valve. This valve replaces conventional two-cycle engine cylinder wall air ports, and improves the two-cycle engine operation. This solves the problem of boosting the two-cycle engine power by super high pressurized air injection and enables the realization of a great potential possibility of a two-cycle engine—at least twice the specific power of a four-cycle engine with other things being equal.

The engine, compressor, and pump operation is the function of the two independent arguments: first—the swash plate angle, second—the distance between the rotor centerline and the swash plate hinge pin axis. The first argument determines the engine, compressor, and pump displacement volume. The second argument determines the engine compression ratio. The widely known engine compression ratio determines the kind of fuel (fuel octane rate) and determines a very important requirement: the engine compression ratio must be independent of the engine displacement volume change while the engine operates with the given fuel. This requirement executes in full the hybrid synchronizing mechanism in accordance with the next proof.

Figure 21A:
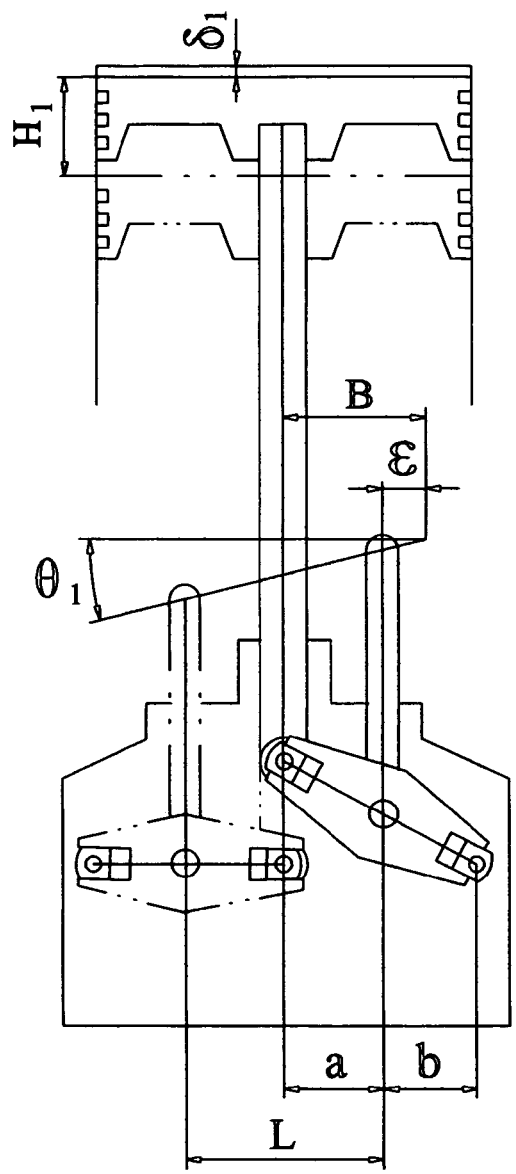
FIG. 21A is a kinematical diagram, which shows minimum engine displacement volume of the hybrid in accordance with the present invention.
Figure 21B:
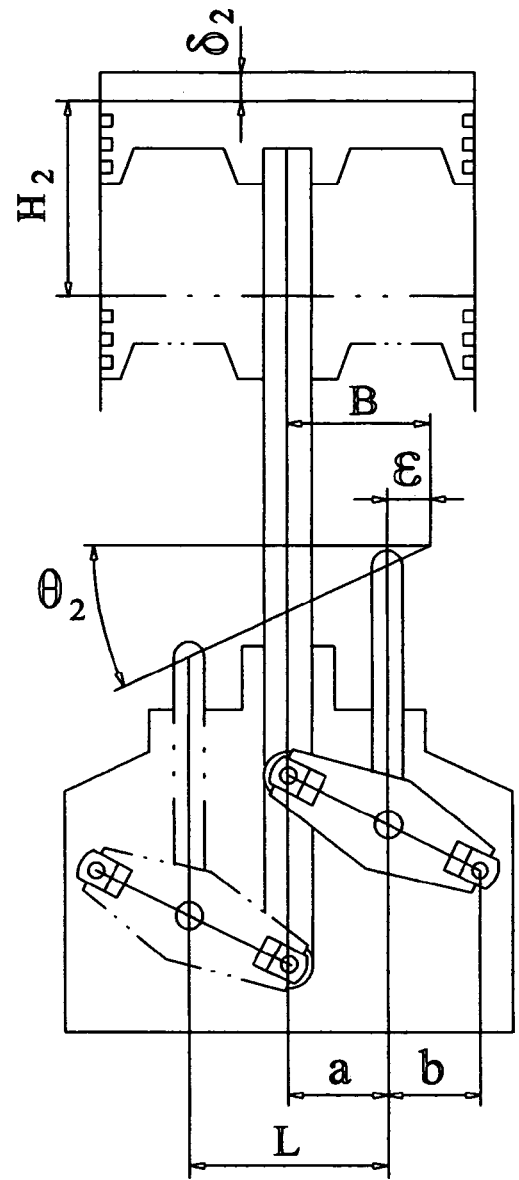
FIG. 21B is a kinematical diagram, which shows maximum engine displacement volume of the hybrid in accordance with the present invention.

The proof of the engine displacement volume changing independent of the engine compression ratio is shown (see FIG. 21A, 21B).

The hybrid compressor piston stroke h per half rotor revolution is equal to the axial rod stroke and in accordance with the widely know axial mechanism is $$h = L \tan \Theta \qquad (1)$$

where L is the distance between axial rod axis $\Theta$ is the swash plate angle The engine piston stroke H greater than the compressor piston stroke h in accordance with the lever ratio $i=(a+b)/b$ where a, b is the lever arms $$H = ih = iL \tan \Theta \qquad (2)$$

where H is the engine piston stroke

The widely known engine compression ratio $\Lambda$ is $$\Lambda = (\partial + H)/\partial \qquad (3)$$

where $\partial$ is the engine piston clearance

Lets swash plate hinge pin axis dispose on the line connecting an axial rod sphere centers.

$$\text{If } \Theta = 0: H = 0 \text{ and } \partial = 0 \qquad (4)$$

The engine piston clearance $\partial$ is $$\partial = i \epsilon \tan \Theta \qquad (5)$$

here $\epsilon$ is the distance between the axial rod axis and the swash plate hinge pin axis The equations (2), (3), (4) and (5) gives the engine compression ratio.

$$\Lambda = 1 + L/\epsilon \qquad (6)$$

Because $$\epsilon = B - L/2 \qquad (7)$$

where B is the distance between the rotor centerline and the swash plate hinge pin axis the equations (6) and (7) gives the engine compression ratio.

$$\Lambda = (2B+L)/(2B-L) \qquad (8)$$

hence $$B = L(\Lambda+1)/2(\Lambda-1) \qquad (9)$$

The proof gives us:

1. The engine compression ratio is independent of the swash plate angle $\Theta$ in accordance with equation (8). This is because both the engine piston stroke H and the clearance $\partial$ is proportional to the swash plate angle tangent (see equations 2 and 5). This provides the engine operation with the variable displacement volume and invariable compression ratio during the swash plate angle $\Theta$ alteration (moveable pin) while the swash plate hinge pin is fixed (B=const).

2. The engine compression ratio is dependent on the distance B between the rotor centerline and the swash plate hinge pin axis in accordance with equation (8). This enables the different kind of fuel use and the engine transformation into an omnivorous engine by means of the distance B alteration.

The example of the distance B depending on the engine compression ratio:

Lets the engine with the distance between axial rod axis L=60 mm work with the compression ratio A=10 and the equation (9) gives B=36.7 mm.

Lets the other fuel requires the engine compression ratio two times greater with A=20 and the equation (9) gives B=33.2 mm.

This example illustrate that the distance B small change gives great engine compression ratio alteration. Also this example illustrates the effective and easy method of the engine transformation into an omnivorous engine by means of the distance B alteration (moveable hinge pin).

The FIG. 18A illustrates the minimum engine displacement volume in accordance with the minimum swash plate angle $\Theta$ incline. The FIG. 18B illustrates the maximum engine displacement volume in accordance with the maximum swash plate angle $\Theta$ incline.

The swash plate turn mechanism and swash plate turn hydraulic system realizes the possibility of the engine operating with the variable displacement volume and the invariable engine compression ratio while the swash plate hinge pin is fixed (B=const).

The swash plate shift mechanism and swash plate shift hydraulic system realizes the possibility of the engine operating with a different kind of fuel, and the engine becomes, in essence, an omnivorous engine.

The engine, compressor and pump variable displacement volume gives the additional ability of adapting the engine power to the automotives wider variable load and speed range.

The engine and compressor displacement volume simultaneously increase gives the additional ability of adapting the engine power to the automotives wider variable load and speed range.

The hydrostatic motor and stabilizer motor connection in series enables said hydrostatic motor displacement volume to be controlled automatically by the stabilizer motor inlet fluid pressure to maintain permanent independence of the engine load and cycle per min.

The engine, compressor, and pump variable displacement volume provides the engine operation with the minimum specific fuel consumption during the automotive's wider variable load and speed range.

Figure 22A:
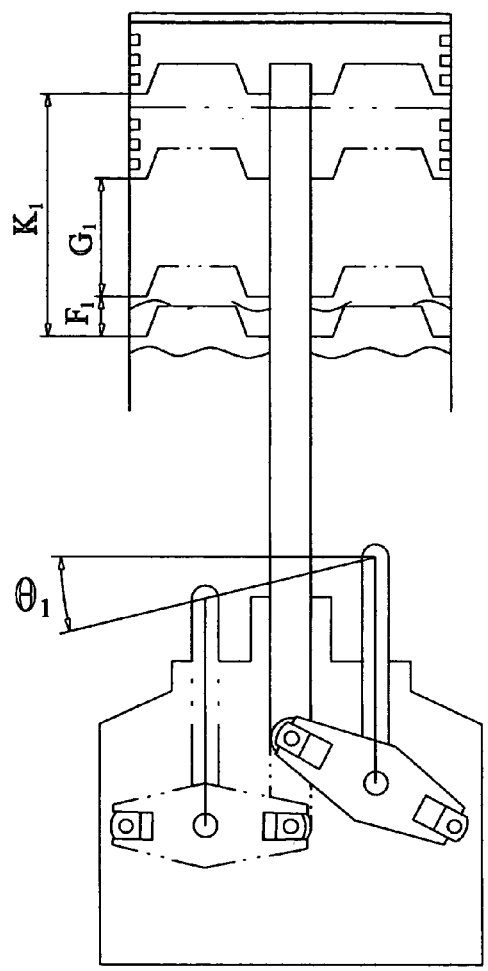
FIG. 22A is a kinematical diagram, which shows minimum engine, compressor, and pump displacement volume of the hybrid in accordance with the present invention.

The FIG. 22A illustrates the compressor piston stroke $F_1$ and the distance between compressor and engine pistons change from $G_1$ to $K_1$ during the half rotor revolution. This distance change determines the compressor displacement volume and the compressor compression ratio in accordance with the swash plate angle $\Theta 1$ incline.

Figure 22B:
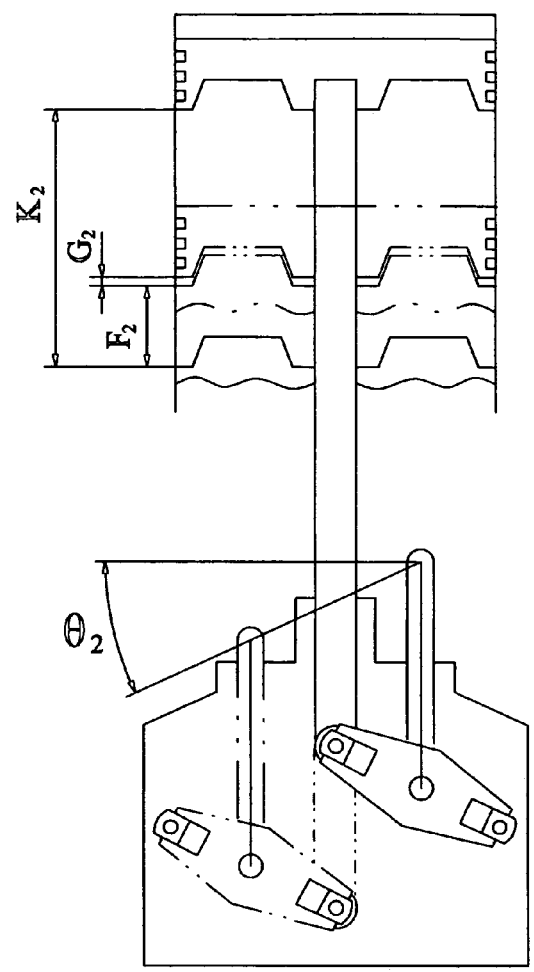
FIG. 22B is a kinematical diagram, which shows maximum engine, compressor, and pump displacement volume of the hybrid in accordance with the present invention.

The FIG. 22B illustrates the compressor piston stroke $F_2$ and the distance between compressor and engine pistons change from $G_2$ to $K_2$ during the half rotor revolution. This distance change determines the compressor displacement volume and the compressor compression ratio in accordance with the greater swash plate angle $\Theta 2$ incline.

The FIG. 22B by comparison with the FIG. 22A illustrates the compressor displacement volume and the compressor compression ratio increase simultaneously with the swash plate angle and the engine displacement volume increase.

All of these factors combine to provide use of the progressive hydrostatic transmission with variable displacement volume of the engine, compressor, pump, and hydrostatic motor instead of widespread automotive engine and automatic transmission, thereby minimizing the weight, installation space, cost, labor, and fuel consumption. Pneumohydraulic accumulator charging.

Figure 5:
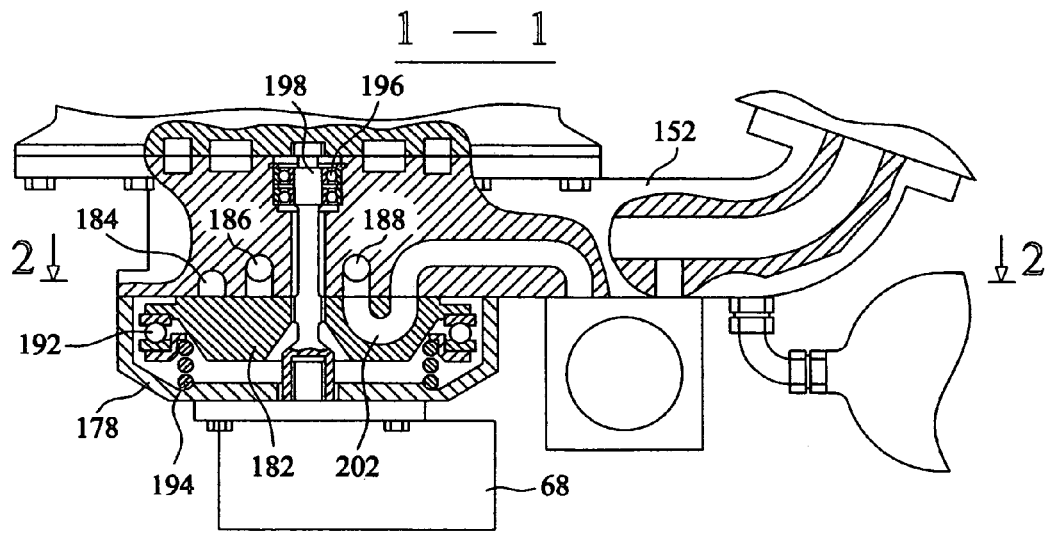
FIG. 5 is a detailed view of the portion indicated by the section lines 1-1 in FIG. 4.
Figure 6:
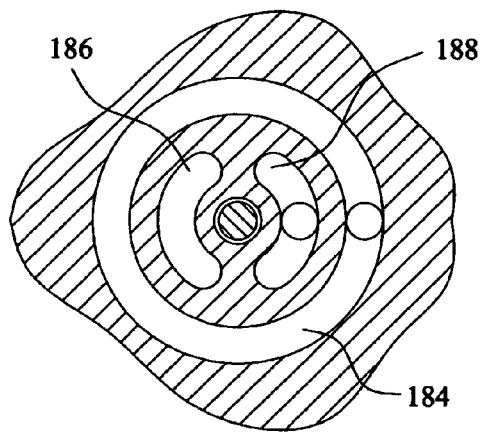
FIG. 6 is a detailed view of the portion indicated by the section lines 2-2 in FIG. 5.

While the hydrostatic motor shaft is stopped, the PHA fluid pressure low magnitude determines the signal from the fluid pressure sensor (not illustrated) and on board computer (not illustrated) automatic switches on the solenoid 368 of the distributor 364. The distributor's 358 solenoid 362 is switched off. The fluid flow occurs in accordance with hydraulic diagram FIG. 18G during engine piston power stroke and in accordance with hydraulic diagram FIG. 18H during engine piston return stroke. The PHA charge provides the spin valve, which disc actuates the rotor by means of the intermediate shaft 198 (FIG. 5)

During the engine piston power stroke, the pump supply goes to the PHA and the spin valve with the distributor 364 provides fluid supply to the stabilizer motor inlet from the replenishing system pump 68. During the engine piston return stroke, the spin valve with the distributor 364 provides the PHA fluid supply to the stabilizer motor inlet and, simultaneously, distributor 358 provides fluid supply to the pump inlet from pump 68.

Because the stabilizer motor intake during the half rotor revolution is only half of the pump displacement volume (stabilizer motor volume and pump volume is approximately equal during whole cycle), about half pump displacement volume of the fluid entered the PHA during one cycle (one rotor revolution). So, the PHA fluid pressure increases during one cycle. The signal from the fluid pressure sensor switches the solenoid 368 off, switches the solenoid 366 on, and the distributor 364 switches to the idling position when the fluid pressure achieves maximum.

Thus, the engine fast charges the PHA automatically. The hybrid solves the problem of charging a PHA automatically, irrespective of the parking time, even if the fluid pressure is greatly decreased. The starter pump 402 (FIG. 18) by means of the pedal 404 provides an opportunity to increase the PHA fluid pressure by human power in case of an emergency. Thus, the hybrid readies the engine for next high power, fast start.

The variable displacement volume of the engine, pump, and hydrostatic motor providing the engine power adaptation to the wider variable load and speed range enables the hydrostatic motor and electric motor direct, mechanical association. The hybrid system provides stand-by electric energy utilization by means of plug-in during the electric motor in the generator mode charges the electric battery (not illustrated). So, the hydrostatic motor 44 and electric motor 46 shafts connecting to one gear 352 (FIG. 18) by engaged and disengaged clutches 354, 356 provide joint and separate hydrostatic motor and electric motor operation in either combination.

The gear 352 can be connected to automotive wheels by means of a differential (not illustrated) and in case of both clutches disengaged the automotive can be braked, can be free rolling, and the electric motor in mode of the generator can charge the electric battery by means of plug-in. Both clutches are engaged during hard acceleration from a stop and provide maximum power, in this case the hydrostatic motor and the electric motor work in tandem. This operation mode occurs when driving conditions demand more power, such as while climbing a hill or passing other vehicles. In case the hydrostatic motor's clutch is engaged and electric motor's clutch is disengaged, the automotive drives the engine by the hydrostatic transmission. In the case that the hydrostatic motor's clutch is disengaged and electric motor's clutch is engaged, the possibility of the regenerative braking is provided, the electric battery can charge during deceleration, and stand-by energy can increase. This operation mode with engine variable displacement volume considerably decreases the fuel consumption.

All hybrid advantages enable us to considerably decrease the automotive fuel consumption.

The following illustrates the approximate fuel economy of the monocylindrical hybrid use in a car with the progressive hydrostatic transmission under city driving conditions.

| Method of the fuel economy | Rate fuel economy |
| --- | --- |
| 1. All modes operation with the minimum specific fuel consumption | 18% |
| 2. Direct energy transmission with the air intercooling supercharger | 12% |
| 3. Engine shut down at every red traffic light | 8% |
| 4. Engine and progressive hydrostatic transmission lighter weight | 7% |
| 5. Energy recuperation with smaller engine capacity | 30% |
| Total | 75% |

The monocylindrical hybrid with the direct energy transmission, variable engine, compressor, and pump displacement volume and hydrostatic transmission energy recuperation enables us to achieve approximately 80 miles per gallon in city conditions and to maintain the automotive acceleration magnitude.

The monocylindrical hybrid enables at least:

using a two-cycle engine with either diesel fuel or two-cycle gasoline engine. In case diesel is used, a conventional system of the injection pump and the fuel injector into cylinder head (not illustrated) are used. In case gasoline is used, a conventional fuel injection system with spark plug into cylinder head (not illustrated) is used. In either case a conventional throttle (not illustrated) is used to control the amount of air entering the intake line of compressor using conventional fuel, cooling, electric and other accessory systems, this considerably decreases manufacturing cost using the additional engine cooling by the receiver water jacket separately or jointly with the engine cooling system, or engine cooling by air using the pressurized air in the receiver for other purposes, for example, pumping more air into the tires using with various kinds of hydrostatic transmission such as variable or fixed displacement conventional motor, closed or open loop; and providing the cylinders of machinery work equipment with high pressurized fluid using the installation in machinery with either orientation of the engine cylinders axis: vertical or horizontal, or the either angle using various kinds of the swash plate turn automatic system with the engine torque and rotor angle speed signal and with either kind of the feedback: electric, hydraulic, or mechanical using with various kinds of gaseous fuels such as propane, natural gas, methane, hydrogen, etc. by means of simple swash plate shift mechanism using the swash plate shift mechanism with automatic or button control for the engine compression ratio alteration and either kind of fuel utilization using the fuel spontaneous combustion (detonation) for more power output per engine displacement volume thanks to the direct energy transmission from engine piston to the pump plunger using the pump's rotor with lobes driving a compressor's valves both the variable displacement hybrid and invariable displacement hybrid.

Thanks to the foregoing advantages the monocylindrical hybrid may be used in trucks, locomotives, boats, motorcycles, aircraft, portable power systems, construction machinery, automobiles and any other kind of the automotive equipment.

What is claimed as being new and desired to be protected by Letters Patent of the United States is as follows:

1. A monocylindrical hybrid powertrain comprising a hybrid engine, a compressor, a pump, a pneumohydraulic accumulator, and a hydrostatic motor;
    said engine further comprising a cylinder and a camshaft;
    said pump further comprising a plunger fastened to an engine piston, a chamber having a canal within a rotor having an axis and having a stabilizer motor, a valve plate which synchronizes a mechanism's axial rods, compensating pistons, a sliding holder, a lever, and a pivotable swash plate with a turn and shift system and a turn and shift system bracket;
    said powertrain further comprising a hydraulic system having a replenishing pump having an axis and a shaft; and
    said hydraulic system further comprising a pneumohydraulic accumulator further comprising a spin valve having an axis and said engine cylinder fastened to at least one said hydrostatic motor by said valve plate and forming a hydrostatic transmission solid monoblock.

2. The monocylindrical hybrid powertrain of claim 1, wherein said valve plate further comprises two sides, said pump further comprises slots, said spin valve further comprises a circular and two autonomous slots, and said stabilizer motor further comprises slots;
    wherein said engine cylinder and said swash plate shift system bracket are fastened to one said valve plate side connected to said rotor by said pump's slots and said stabilizer motor's slots, and said opposite valve plate side is fastened to said spin valve and is associated with said spin valve by means of said circular and two autonomous slots.

3. The monocylindrical hybrid powertrain of claim 1, wherein said hydraulic system further comprises valves, distributors, and check valves mounted on said valve plate which are fluidly connected by said valve plate canals, said monoblock, and are in line with said rotor axis,
    said replenishing pump shaft axis and said spin valve axis are located on one center line.

4. The monocylindrical hybrid powertrain of claim 1, wherein said replenishing pump's shaft is connected to said rotor by an intermediate shaft which is simultaneously connected to said spin valve and located within said valve plate;
    and said spin valve is mounted on said valve plate by means of a bearing and spring.

5. The monocylindrical hybrid powertrain of claim 1, wherein said compensating pistons have a smaller diameter than said axial rods and formed differential pistons within a pump chamber.

6. The monocylindrical hybrid powertrain of claim 1, wherein said compensating pistons further comprise ends located within a rotor's autonomous slots and are fluidly connected with an axial canal located diametrically opposite to a pump chamber canal and both canals being associated with a valve plate inlet slot and a valve plate outlet slot of said pump.

7. The monocylindrical hybrid powertrain of claim 1, wherein said one axial rod is coupled directly and pivotably to said lever which is connected to a pump plunger end by means of an assembled crossbar, and a second axial rod is coupled directly to a sliding holder.

8. The monocylindrical hybrid powertrain of claim 1, wherein said hydrostatic motor is associated with at least one said electric motor and a hydrostatic motor shaft; and an electric motor's shaft is located on one axis and is coupled with one gear respectively by first and second clutches.

9. The monocylindrical hybrid powertrain of claim 1, wherein a first hydraulic distributor with solenoids is a four-way distributor having a first line connected in parallel with an outlet of said pump and an inlet of said hydrostatic motor by a check valve;
    a second line is coupled with said pump inlet;
    a third line is coupled in parallel with said replenishing pump outlet and an outlet of said stabilizer motor; and
    a fourth line is coupled with said pneumohydraulic accumulator.

10. The monocylindrical hybrid powertrain of claim 9, wherein said first hydraulic distributor has two positions: a first position wherein said first and third lines are connected and said second and fourth lines are connected, and a second position wherein said first and fourth lines are connected and said second and third lines are connected.

11. The monocylindrical hybrid powertrain of claim 1, wherein a second hydraulic distributor with solenoids is a three-way distributor having a first line connected to an inlet of said stabilizer motor, a second line is coupled with a circular slot of said spin valve and a third line is connected to said pneumohydraulic accumulator.

12. The monocylindrical hybrid powertrain of claim 11, wherein said second hydraulic distributor has three positions: a first position wherein said first and third lines are connected and said second line is closed, a second position wherein all lines are closed, and a third position wherein said first and second lines are connected and said third line is closed.

13. The monocylindrical hybrid powertrain of claim 1, wherein a first autonomous slot of said spin-valve is coupled with said pneumohydraulic accumulator and a second autonomous slot of said spin-valve is coupled with an outlet of said replenishing pump.

14. The monocylindrical hybrid powertrain of claim 13, wherein said spin-valve has two positions: a first position wherein said spin-valve circular slot is connected with said first autonomous slot, and a second position wherein said spin-valve circular slot is connected with said second autonomous slot.

15. A method of monocylindrical hybrid powertrain operation comprising the steps of:
   (a) providing an engine piston return stroke by means of a pneumohydraulic accumulator wherein potential energy is accumulated during the movement of said engine piston prior to a power stroke, and
   (b) providing an engine start by means of a pneumohydraulic accumulator fluid supply which actuates a stabilizer motor's motion during an engine piston's downward stroke; and during an engine piston return stroke said pneumohydraulic accumulator is actuated simultaneously with said stabilizer motor motion and a pump plunger motion occurs in the capacity of a linear hydraulic motor, and
   (c) providing an idling operation by means of a pump supply which charges said pneumohydraulic accumulator and simultaneously actuates said stabilizer motor motion during said engine power stroke and during said engine piston return stroke; said pneumohydraulic accumulator fluid supply actuates said stabilizer motor and while said replenishing pump simultaneously delivers fluid to a pump inlet, and
   (d) providing said hydrostatic motor with a smooth operation independent of a pump supply pulsation by means of pump charges by said pneumohydraulic accumulator while simultaneously actuating a connection in series of said hydrostatic motor and said stabilizer motor during said engine power stroke and during said engine piston return stroke; said pneumohydraulic accumulator actuated said hydrostatic and said stabilizer motors and replenishing pump feeds said pump, and
   (e) providing permanent pushing of said axial rods against said swash plate by means of said pneumohydraulic accumulator fluid pressure actuates said axial rods and compensating pistons inside of said pump chamber during said engine piston power stroke and during said engine piston return stroke said pneumohydraulic accumulator actuates said compensating piston ends outside of said pump chamber, and
   (f) providing said pneumohydraulic accumulator charging by means of said pump
   and simultaneously said stabilizer motor receives fluid from said replenishing pump during said engine piston power stroke and during said engine piston return stroke said pump receives fluid from said replenishing pump and said pneumohydraulic accumulator actuate said stabilizer motor, and
   (g) providing said stabilizer motor feeding during said pneumohydmulic accumulator charging by means of said rotor actuate motion of said spin valve which automatically connects said stabilizer motor inlet with said pneumohydraulic accumulator and said replenishing pump in turn during one rotor revolution
   (h) providing stand-by electric energy utilization by means of plug-in electric motor and said hydrostatic motor shafts mechanically associated, and
   (i) providing said hydrostatic motor and the electric motor separate or joint operation said hydrostatic and electric motor shafts connected to one gear by means of clutches which can be engaged or disengaged in either combination.

* * * * *